(12) United States Patent
Lo

(10) Patent No.: US 12,223,005 B2
(45) Date of Patent: **\*Feb. 11, 2025**

(54) GENERATING A CONTEXTUAL SEARCH STREAM

(71) Applicant: Snap Inc., Santa Monica, CA (US)

(72) Inventor: Bobby Lo, San Francisco, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,697

(22) Filed: Nov. 29, 2023

(65) Prior Publication Data
US 2024/0104146 A1   Mar. 28, 2024

Related U.S. Application Data

(63) Continuation of application No. 17/720,615, filed on Apr. 14, 2022, which is a continuation of application No. 16/403,149, filed on May 3, 2019, now Pat. No. 11,334,633, which is a continuation of application
(Continued)

(51) Int. Cl.
| | |
|---|---|
| *G06F 16/95* | (2019.01) |
| *G06F 16/2457* | (2019.01) |
| *G06F 16/9038* | (2019.01) |
| *G06F 16/951* | (2019.01) |

(Continued)

(52) U.S. Cl.
CPC .... *G06F 16/9538* (2019.01); *G06F 16/24575* (2019.01); *G06F 16/9038* (2019.01); *G06F 16/951* (2019.01); *G06F 16/24532* (2019.01)

(58) Field of Classification Search
CPC .............. G06F 16/951; G06F 16/24532
See application file for complete search history.

(56) References Cited

U.S. PATENT DOCUMENTS

| | | | |
|---|---|---|---|
| 5,987,454 A | 11/1999 | Hobbs | |
| 6,493,702 B1 * | 12/2002 | Adar | ............... G06F 16/9562 |
| | | | 707/738 |

(Continued)

OTHER PUBLICATIONS

U.S. Appl. No. 14/176,997 U.S. Pat. No. 10,331,743 filed Feb. 10, 2014, System and Method for Generating and Interacting With a Contextual Search Stream.

(Continued)

*Primary Examiner* — Eliyah S. Harper
(74) *Attorney, Agent, or Firm* — SCHWEGMAN LUNDBERG WOESSNER, P.A.

(57) ABSTRACT

Systems and methods are provided for retrieving first query result data associated with a first user account and rendering the first query result data into a first result item, generating a shareable search result stream comprising the first result item associated with the first user account, retrieving second query result data associated with a second user account and rendering the second query result data into a second result item, adding the second result item to the shareable search result stream associated with the first user account, and providing the sharable search result stream comprising the first result item and the second result item to a first computing device associated with the first user account and a second computing device associated with the second user account.

20 Claims, 22 Drawing Sheets

Related U.S. Application Data

No. 14/176,997, filed on Feb. 10, 2014, now Pat. No. 10,331,743.

(60) Provisional application No. 61/762,745, filed on Feb. 8, 2013, provisional application No. 61/762,749, filed on Feb. 8, 2013.

(51) Int. Cl.
*G06F 16/9538* (2019.01)
*G06F 16/2453* (2019.01)

(56) References Cited

U.S. PATENT DOCUMENTS

| | | | | |
|---|---|---|---|---|
| 6,523,022 | B1* | 2/2003 | Hobbs | G06F 16/332 |
| | | | | 707/999.005 |
| 6,633,885 | B1* | 10/2003 | Agrawal | G06F 16/951 |
| | | | | 707/999.005 |
| 7,031,961 | B2* | 4/2006 | Pitkow | G06F 16/9562 |
| 7,188,317 | B1 | 3/2007 | Hazel | |
| 7,599,922 | B1* | 10/2009 | Chen | G06F 16/951 |
| | | | | 707/999.005 |
| 7,822,759 | B2* | 10/2010 | MacLaurin | G06Q 30/0603 |
| | | | | 707/769 |
| 8,005,823 | B1* | 8/2011 | Marshall | G06F 16/2455 |
| | | | | 707/769 |
| 8,122,041 | B2 | 2/2012 | Kamireddy et al. | |
| 8,464,158 | B2* | 6/2013 | Laakso | G06F 16/951 |
| | | | | 715/738 |
| 8,719,251 | B1* | 5/2014 | English | G06F 16/90328 |
| | | | | 707/713 |
| 8,918,389 | B2* | 12/2014 | Velipasaoglu | G06F 16/90324 |
| | | | | 707/723 |
| 9,002,972 | B2* | 4/2015 | Meyer | G06F 21/562 |
| | | | | 709/204 |
| 9,218,358 | B2* | 12/2015 | Shaban Hussein | G06F 16/182 |
| 9,275,121 | B2* | 3/2016 | Ah-Soon | G06F 16/256 |
| 9,443,016 | B2 | 9/2016 | Lo | |
| 9,785,655 | B2* | 10/2017 | Kleiman | G06F 16/532 |
| 10,142,272 | B2* | 11/2018 | Chakra | H04L 51/52 |
| 10,331,743 | B2 | 6/2019 | Lo | |
| 11,144,559 | B2* | 10/2021 | Rahman | G06F 16/24578 |
| 11,334,633 | B1 | 5/2022 | Lo | |
| 2005/0149508 | A1 | 7/2005 | Deshpande | |
| 2007/0073703 | A1 | 3/2007 | Quin | |
| 2007/0136244 | A1 | 6/2007 | Maclaurin et al. | |
| 2008/0097975 | A1 | 4/2008 | Guay et al. | |
| 2008/0104071 | A1 | 5/2008 | Pragada | |
| 2009/0006382 | A1 | 1/2009 | Tunkelang et al. | |
| 2009/0012940 | A1 | 1/2009 | Ives et al. | |
| 2009/0083314 | A1* | 3/2009 | Maim | G06F 40/194 |
| 2009/0228434 | A1 | 9/2009 | Krishnamurthy et al. | |
| 2009/0287618 | A1* | 11/2009 | Weinberger | H04L 51/212 |
| | | | | 706/10 |
| 2010/0005087 | A1 | 1/2010 | Basco et al. | |
| 2010/0205190 | A1 | 8/2010 | Morris et al. | |
| 2010/0228711 | A1* | 9/2010 | Li | G06F 16/248 |
| | | | | 707/706 |
| 2012/0036137 | A1 | 2/2012 | Naidu et al. | |
| 2012/0078870 | A1 | 3/2012 | Bazaz | |
| 2014/0143223 | A1 | 5/2014 | Shi et al. | |
| 2014/0229462 | A1 | 8/2014 | Lo | |
| 2022/0237241 | A1 | 7/2022 | Lo | |

OTHER PUBLICATIONS

U.S. Appl. No. 16/403,149 U.S. Pat. No. 11,334,633, filed May 3, 2019, Generating a Contextual Search Stream.

U.S. Appl. No. 17/720,615, filed Apr. 14, 2022, Generating a Contextual Search Stream.

U.S. Appl. No. 14/177,006 U.S. Pat. No. 9,443,016, filed Feb. 10, 2014, System and Method for Generating and Interacting With a Contextual Search Stream.

"U.S. Appl. No. 14/176,997, Examiner Interview Summary mailed Feb. 12, 2018", 3 pgs.

"U.S. Appl. No. 14/176,997, Examiner Interview Summary mailed Jun. 30, 2016", 3 pgs.

"U.S. Appl. No. 14/176,997, Examiner Interview Summary mailed Aug. 2, 2017", 3 pgs.

"U.S. Appl. No. 14/176,997, Examiner Interview Summary mailed Oct. 26, 2018", 3 pgs.

"U.S. Appl. No. 14/176,997, Final Office Action mailed Jun. 11, 2018", 24 pgs.

"U.S. Appl. No. 14/176,997, Final Office Action mailed Sep. 23, 2016", 16 pgs.

"U.S. Appl. No. 14/176,997, Non Final Office Action mailed Mar. 21, 2016", 18 pgs.

"U.S. Appl. No. 14/176,997, Non Final Office Action mailed May 23, 2017", 19 pgs.

"U.S. Appl. No. 14/176,997, Non Final Office Action mailed Nov. 16, 2017", 15 pgs.

"U.S. Appl. No. 14/176,997, Notice of Allowance mailed Feb. 6, 2019", 10 pgs.

"U.S. Appl. No. 14/176,997, Response filed Feb. 15, 2018 to Non Final Office Action mailed Nov. 16, 2017", 15 pgs.

"U.S. Appl. No. 14/176,997, Response filed Jun. 20, 2016 to Non Final Office Action mailed Mar. 21, 2016", 9 pgs.

"U.S. Appl. No. 14/176,997, Response filed Aug. 10, 2017 to Non Final Office Action mailed May 23, 2017", 6 pgs.

"U.S. Appl. No. 14/176,997, Response filed Nov. 13, 2018 to Final Office Action mailed Jun. 11, 2018", 24 pgs.

"U.S. Appl. No. 14/176,997, Response filed Dec. 15, 2016 to Final Office Action mailed Sep. 23, 2016", 13 pgs.

"U.S. Appl. No. 14/177,006, Examiner Interview Summary mailed Apr. 20, 2016", 3 pgs.

"U.S. Appl. No. 14/177,006, Non Final Office Action mailed Dec. 16, 2015", 14 pgs.

"U.S. Appl. No. 14/177,006, Notice of Allowance mailed Jul. 20, 2016", 10 pgs.

"U.S. Appl. No. 14/177,006, Response filed Apr. 18, 2016 to Non Final Office Action mailed Dec. 16, 2015", 11 pgs.

"U.S. Appl. No. 16/403,149, Non Final Office Action mailed Sep. 30, 2021", 11 pgs.

"U.S. Appl. No. 16/403,149, Notice of Allowance mailed Jan. 20, 2022", 9 pgs.

"U.S. Appl. No. 16/403,149, Response filed Dec. 17, 2021 to Non Final Office Action mailed Sep. 30, 2021", 10 pgs.

"U.S. Appl. No. 17/720,615, Notice of Allowance mailed Oct. 25, 2023", 11 pgs.

\* cited by examiner

Recommended Query Llinks

ABSTRACT

GENERATING A CONTEXTUAL SEARCH STREAM

CROSS-REFERENCE TO RELATED APPLICATIONS

This application is a continuation of and claims the benefit of U.S. patent application Ser. No. 17/720,615, filed on Apr. 14, 2022, which is a continuation of and claims the benefit of U.S. patent application Ser. No. 16/403,149, filed on May 3, 2019, now issued as U.S. Pat. No. 11,334,633, which is a continuation of and claims the benefit of U.S. patent application Ser. No. 14/176,997, filed on Feb. 10, 2014, now issued as U.S. Pat. No. 10,331,743, which claims the benefit of U.S. Provisional Application Ser. No. 61/762,745, filed on Feb. 8, 2013, and U.S. Provisional Application Ser. No. 61/762,749, filed on Feb. 8, 2013, which are all incorporated in their entireties by this reference.

TECHNICAL FIELD

This invention relates generally to the search interface field, and more specifically to a new and useful system and method for generating a contextual search stream in the search interface field.

BACKGROUND

The prevailing method of interacting with a given service on the internet is accessing that service's website using a web browser or through an application provided by that service. With each service having its own interface on the internet, services generally operate independently from other services. Typically, users will visit one or more sites and services, often times opening multiple windows and/or tabs, when researching a particular topic, searching with a particular agenda, or completing any other task. The used services (or even multiple interactions within a single service) however are "silo-ed" from other opened information, and each service often has an independent look and feel with a unique navigation/interaction model. Such search behavior presents the user with high cognitive overhead and oftentimes interaction redundancy. Thus, there is a need in the search interface field to create a new and useful system and method for generating a contextual search stream. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Generating a Contextual Search Stream

Figure 1:
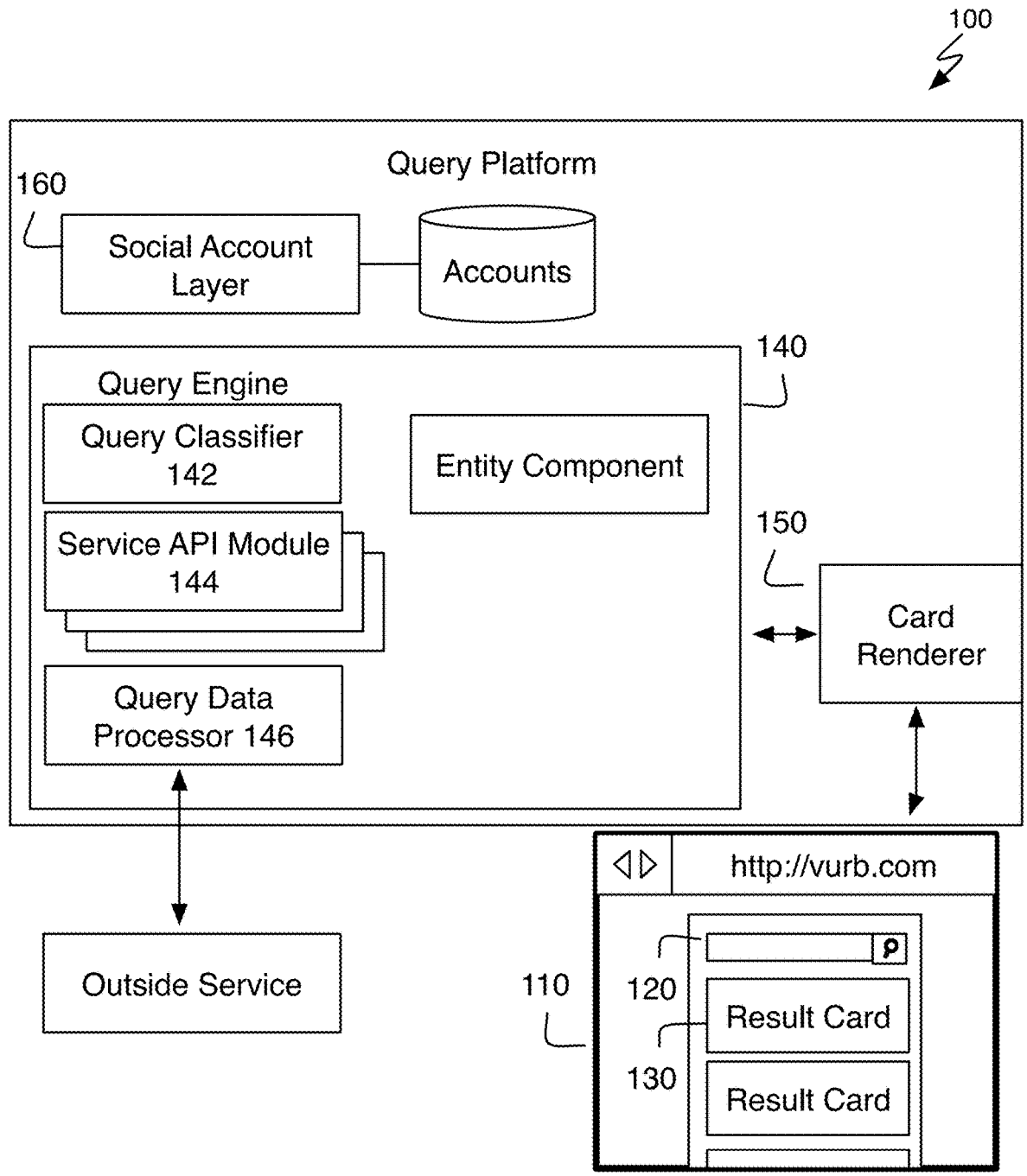
FIG. 1 is a schematic representation of a system of a preferred embodiment.

As shown in FIG. 1, a query platform system 100 of a preferred embodiment can include a card stream interface 110 including at least one query tool 120 and a result card 130; a query engine 140; a card renderer 150; and a social account layer 160. The system 100 functions to provide a sharable search stream with collected information from at least one service (e.g., through an API or through scraping). The search stream that is generated by the system is preferably a series of cards that create an associative trail of cards. The system preferably leverages the contextual information extracted from querying one service in defining the query for another result card. The system 100 preferably enables a user to interact with one or more services through visual query based inputs. The results of the service queries are preferably normalized in the display and functionality of the result cards. A normalized query interface to multiple services can enable seamless transfer and utilization of context and meta data while building a collection of query results. Queries and actions of a user can be persisted throughout a session, enabling information to be organically organized into a stream while using the card stream interface. The queries and service use of a user is centralized to the query platform system, giving the query platform system access and management of the use of a variety of services. The query platform system is preferably constructed as a web service platform executed on at least a server, server cluster, distributed server system, or any suitable computer infrastructure. The query platform may additionally or alternatively include at least partial implementation through a client side component such as a mobile application, desktop application, embedded program, browser plug-in, browser-client application, or any suitable component. The query platform system 100 preferably includes an account or user system such that the query interactions and/or interface may be customized on an account/user basis.

Figure 2:
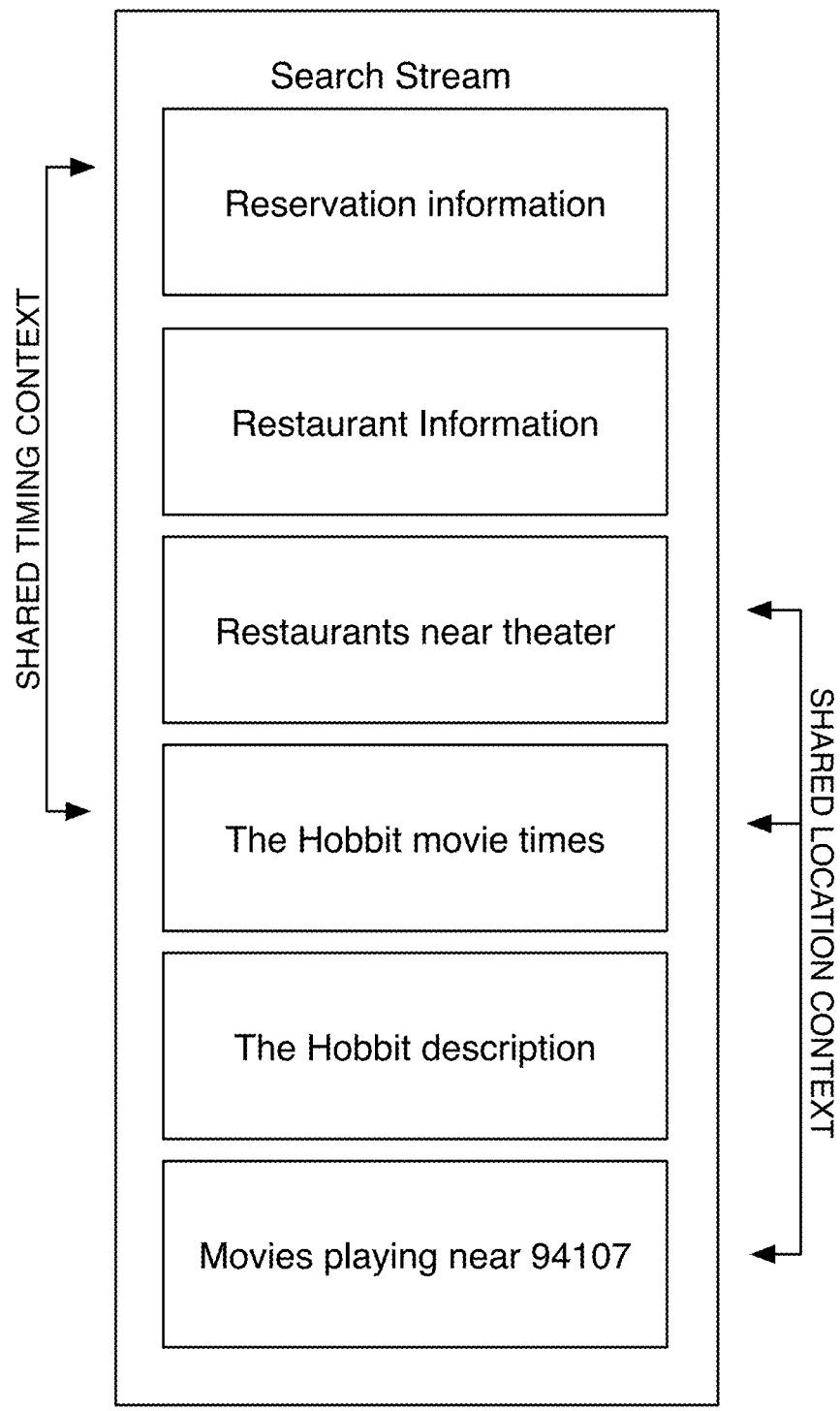
FIG. 2 is schematic representation of an exemplary search stream composed of a plurality of contextually related cards.

A card stream interface 110 functions as a collection of digital query result items (e.g., "cards"). The card stream interface 110 is a user interface for interaction with the query platform system. The card stream interface 110 is preferably presented in a website but may alternatively or additionally be implemented as a mobile application, a desktop application or any suitable application rendering a user interface. The card stream interface 110 preferably includes at least one query tool 120 that can be used to populate the card stream interface with a plurality of result cards 130. The card stream interface 110 is preferably coupled to the query engine 140 and the card renderer 150 for querying various services and rendering results in the stream. A search stream is preferably progressively generated. A user or users will incrementally add result cards 130 to the search stream. As shown in FIG. 2, The result cards 130 of a search stream interface preferably will at times share shared context in that cards may be (at least partially) generated and populated from content of other cards in the search stream. The cards are preferably rendered in the stream as a vertically scrollable list of cards. A user can review the previous queries and results (explicitly saved or from query history) by scrolling through the cards and optionally expanding upon queries through interacting with previous cards. The stream may alternatively be organized as a horizontally organized list, a stacked list, a cover flow navigated list, a gallery grid presentation, a waterfall collection presentation or any suitable interaction metaphor for navigating a collection. In other embodiments, the stream may alternatively provide card organization by a tree hierarchy, path network, and/or any suitable directed or undirected network of cards. Additional non-card elements may additionally be integrated into the card stream interface such as ads, banners, navigational elements, controls, or any suitable components.

Figure 3:
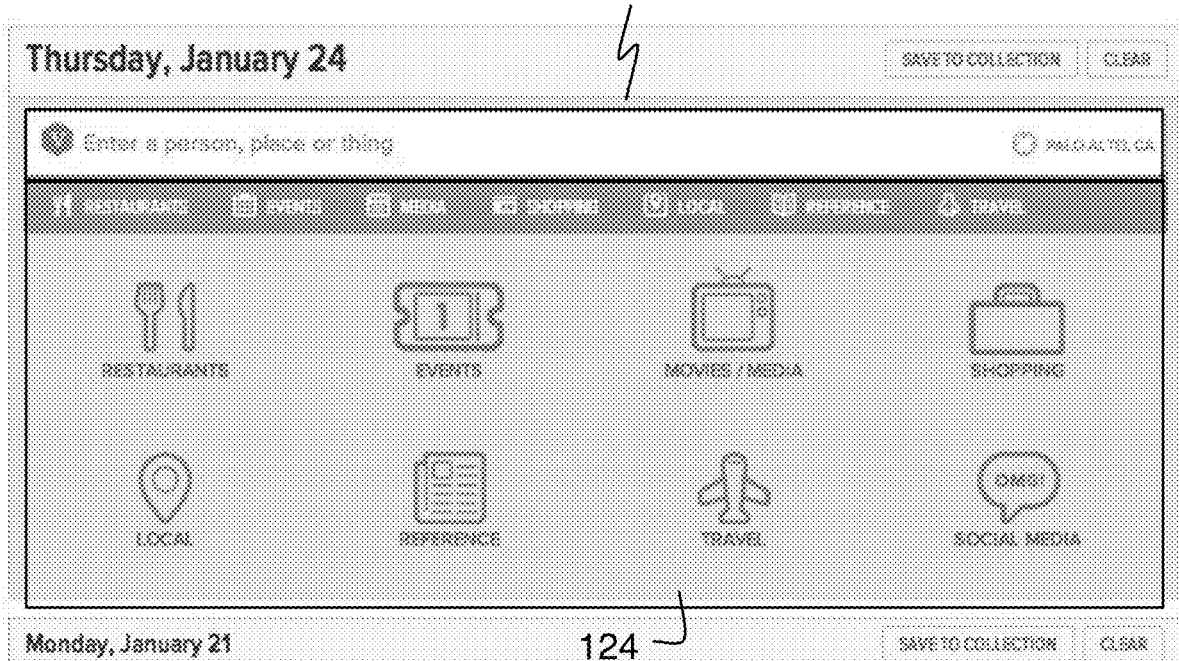
FIG. 3 is screenshot of query tools of a search stream interface of a preferred embodiment.
Figure 3:

A query tool 120 can function to initialize or trigger the querying/search of a service. The query tool 120 is preferably a normalized query tool 120 that can automatically select from a set of one or more query engines, services, and/or APIs. Preferably, there are at least two query engines, but the system can alternatively be used with a single query engine such as for an internal implementation for a single service. As shown in FIG. 3, query tool 120 preferably includes at least a query bar 122, a navigational search interface 124, and/or query links 126. The query links 126 can be embedded in the result cards. The query tools 120 function to allow services to be queried and results added to a stream. In some variations, the query tools 120 cooperate to coach a user in the use of other query tools. For example, use of the navigational search interface 124 may automatically populate the query bar 122 with an equivalent search. In another example, the title of a card generated through a query tool and/or additional context information may be reflected in the resulting card.

A query tool 120 preferably creates a query that is then communicated to the query engine 140 for servicing. A query is preferably designed to include a service identifier, service arguments, any additional or hidden context arguments, and any suitable query elements. The query input is preferably normalized across multiple services. Normalized query inputs are generalized to common format that can be converted to a native query input supplied to an associated service API module. In one variation, the normalized query syntax can include a first word being the service identifier and subsequent words being entity identifiers. The services may be namespaced; developers, companies, services, and other entities may be allowed to register service names within the query platform system. Service identifiers may alternatively be tied to outside namespaces such as a mapping against provided services and DNS. The service identifier can be outside services such as "Yelp", "YouTube", "IMDB", "Facebook", "LinkedIn", "Wikipedia", "Opentable", or any suitable outside service. The service identifier may alternatively be an internal service or meta service provided within the query platform, such as "places", "calculator", "movies", "person", or other general service names. Internal or meta services may selectively tie to outside services or provide general services for which there is no well established service. Arguments can include any suitable information for a service query, such as a search term, dates, times, location, people, item or company identifier, or any suitable argument. The queries can preferably be structured in a natural writing syntax, but any suitable syntax may be used to construct the query. Arguments and/or the service identifiers may be processed by natural language tools to account for variations in specifying a query.

Figure 4A:
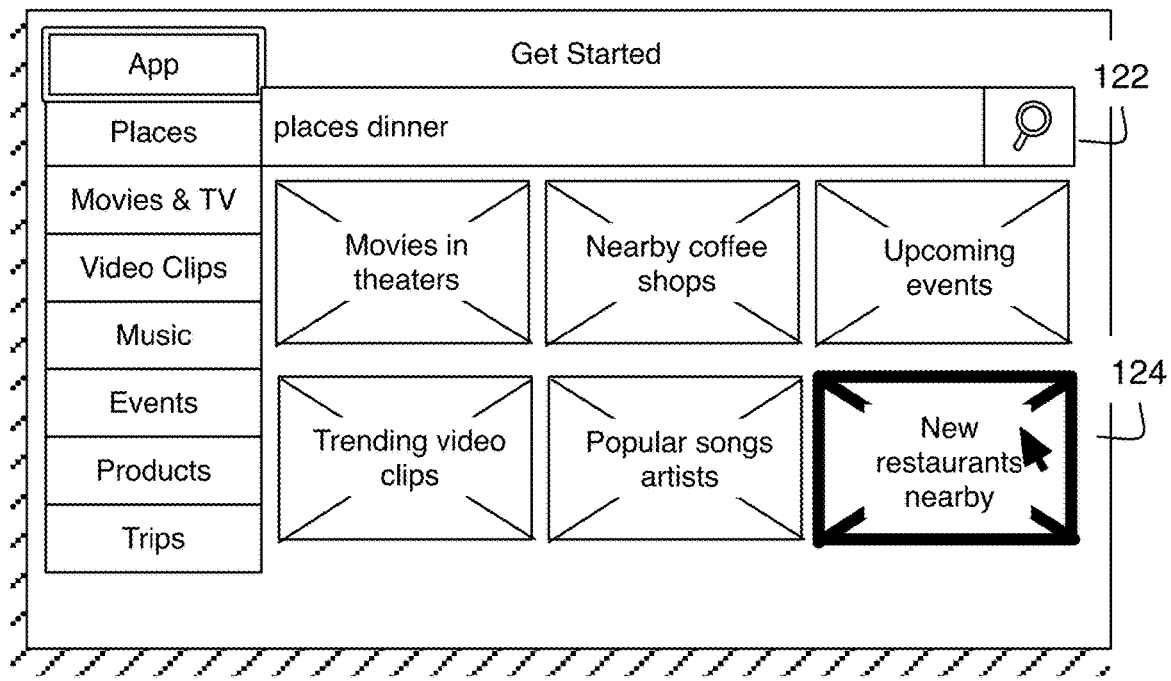
FIGS. 4A-4C are screenshot representations of a modular query tool variation of a preferred embodiment.
Figure 4B:
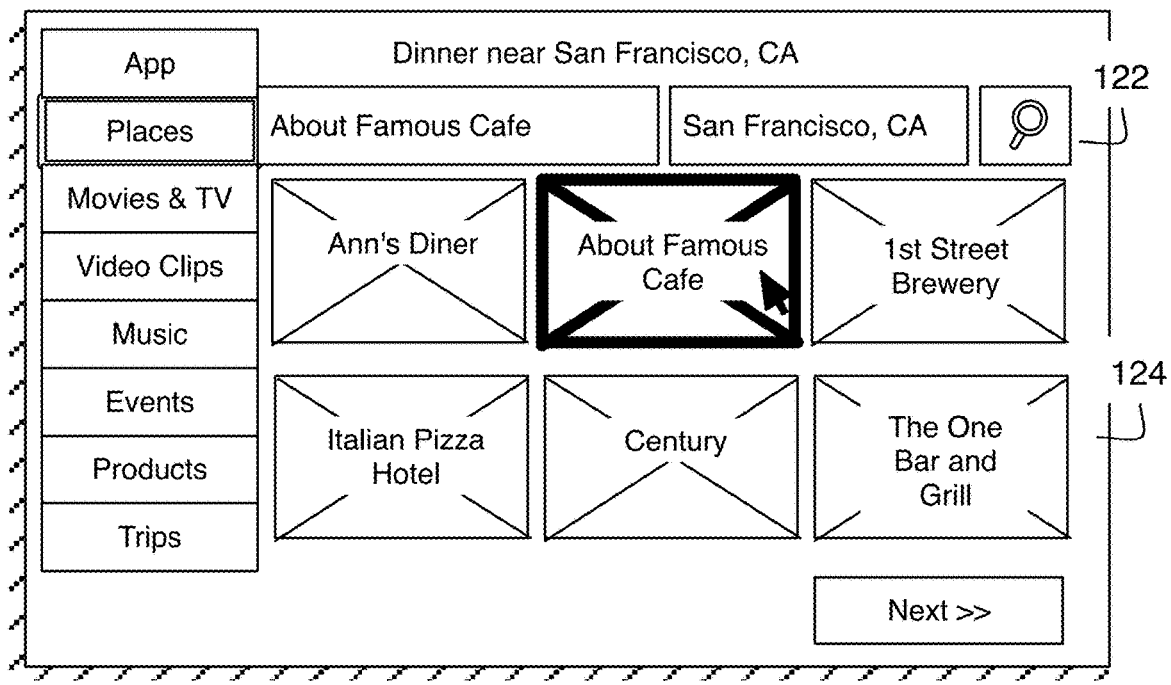
Figure 4C:
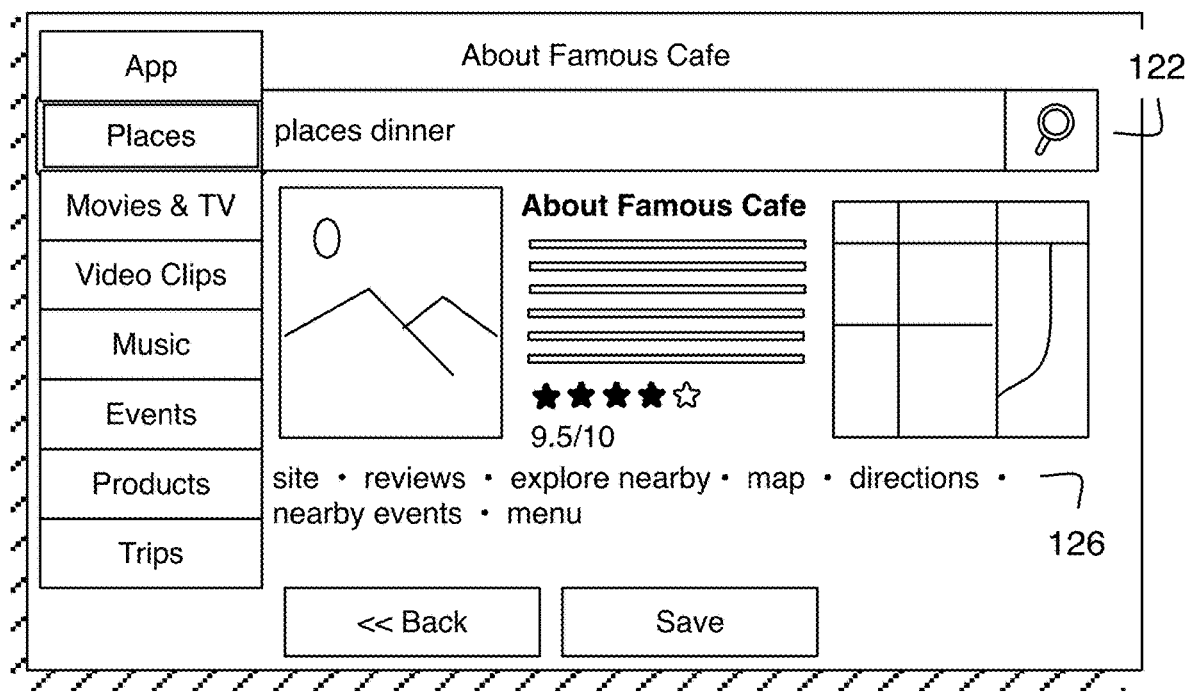

The query bar can be integrated with the search stream or collection of result cards. In one preferred implementation each result card generated by the query bar is automatically saved to the search stream. In another variation, a user must explicitly save a result card to a collection. And in yet another variation, some cards are automatically saved (e.g., "main result cards") while other cards (e.g., "intermediary result cards") are not saved but may be selectively saved. In another variation, a querying interface is separate from the collection interface, creating a stream browsing mode and a query mode. In this variation, the query tool 120 can be displayed as an overlaid modular interface that can be presented with the corresponding result card (when a query has been submitted) as shown in FIG. 4A. As shown in FIGS. 4B and 4C, intermediate result cards of the query tool can be shown and saved within a "stack" or history of result data that can be navigated through forward and backward navigation. In yet another variation, the history of result data can be managed within a separate workspace as a separate stream or collection. The separate workplace can be used as a temporary query workspace that may be cleared after each browsing session, selectively saved, or persisted across multiple sessions. The history of result cards can form the query workspace, where a user can explore result cards and then electively save the cards. Context within the workspace, and even the collection can be integrated. The modular query tool can additionally include explicit saving of the intermediate result card to a search stream. In yet another variation, a query workspace can be presented inline with the other result cards. Cards explicitly saved in the workspace are then moved to the saved result cards. Related context from intermediate result cards can be bundled or linked to save result cards so that the context is not lost.

A query bar 122 of a preferred embodiment is preferably a textbox for direct user input of a query. The query bar may alternatively be any suitable interface for receiving a specified query such as a voice input, image upload and processing interfaces, or any suitable interface to specify a query. The query bar 122 is preferably displayed at the top portion of the card stream interface but it may be positioned or accessed in any suitable manner. As mentioned before, the query bar 122 may be coupled to usage of other query tools, such that a query is displayed in the query bar 122 as a second query tool generates a query. In one variation, hovering over and/or selecting a query option in the navigational search interface 124 will populate the query bar 122 with a corresponding query, which functions to reinforce and communicate the query performed.

A navigational search interface 124 is a visual menu of query options. A navigational search interface 124 functions to guide users in creating a query and exploring the query options. A navigational search interface 124 is preferably one of a plurality of query tools 120. A navigational search interface 124 may additionally be presented if only a service identifier is specified in the query. The navigational search interface 124 is preferably displayed in a card or in an alternative user interface element to present services or types of queries. A top-level navigational search interface 124 preferably includes top level query topics such as restaurants, events, media, shopping, local, reference, travel, social as shown in FIG. 4A, but may include any suitable categories. Selecting a query option will preferably navigate through options until a desired query has been built. For example, a new restaurant top-level option of the navigational search interface 124 may be selected (as shown in FIG. 4A), the navigational search interface transitions to a set of restaurant options using context information of the collection or the user account (as shown in FIG. 4B), and once a final place entity is selected a result card is presented which can be saved (as shown in FIG. 4C). The user can navigate back and forth these visual query steps. The navigational search interface 124 may additionally present user interface elements such as text boxes, date pickers, drop-downs, and other user interface elements to construct a query. As a user navigates through options of a navigational search interface 124, the query bar 122 may be populated with an equivalent query.

Query links 126 of a preferred embodiment are preferably link elements that function to provide link-like UI elements to initiate a query. Query links 126 may be used through out the query platform, and may additionally be used outside of the query platform by other applications or websites using a standard link protocol. The query links 126 are preferably used within a card to allow related cards to be added to the search stream. Within a card, a query link 126 can be a related or recommended query based on the current card and/or the cards contained in the stream. Clicking a query link 126 will typically result in a query being performed and a card added to the search stream. Query links 126 are often links to outside services that are converted to generate a card with information equivalent from the outside service. The query links may alternatively be links to internal services, the same service as the associated card. A menu could additionally be used to submit sub-queries to a service or related services of a card.

Figure 5:
FIG. 5 is a screenshot of an exemplary result card.

As shown in FIG. 5, result card 130 of a preferred embodiment is a visual element that communicates the processed results of a query. A result card 130 is alternatively described as a query result item. The result card/result item 130 acts as a visually tangible user interface element representing query result data from at least one query submitted to a service. A search stream will preferably include a plurality of result cards 130. Each result card 130 (or more simply put card) is preferably the result of at least one service query. In alternative embodiments, multiple services and/or queries may be used to generate or retrieve the data used in the result card 130. In another variation, a plurality of result cards 130 may be generated from a single query. Preferably, result cards 130 in a search stream will share context data that is used. Cards 130 are preferably presented as block user interface elements with a normalized appearance (i.e., substantially consistent appearance across services). However, the cards may alternatively be formatted with any suitable representation. In one variation, a card is rendered in a consistent manner across queries to a particular service or more preferably to queries to similar services. The result cards 130 will preferably include a title, content, reference links to source information (e.g., webpage of the associated service or to an application of the service), and recommended query links. The title will preferably reflect the query used to generate the contents of the card 130. The content is preferably formatted data that resulted from the query. The content can be informational, data, or media for consumption by a user. However, the content may additionally include interactive elements such as forms, applications, application/service/device controls, or any suitable input that may be used to alter state. For example, a result card 130 may be able to allow a user to add content to an outside service (e.g., submit a blog post, tweet, update a profile, Etc.). In one variation, the card stream interface 110 preferably prompts a user to confirm actions performed outside of the query platform. For example, if a user selects a movie time in a movie card, the user may be directed to a site to purchase tickets at that time. When the user returns to the query platform, the user may be asked to confirm the purchase of those tickets and then a time and location context may be set based on that action. Recommended query links are preferably query links 126 for related service queries. The recommended queries may include query links 126 for similar searches in the same service, queries using similar services, queries using a favorite/preferred service of a user, or any suitable recommended query. For example, a card 130 with content relating to a movie show time may include recommended query links 126 for restaurants near the movie theater, movie reviews, events after or before the movie, or any suitable recommended query. Recommended query links 126 are preferably displayed in the footer of a card 130, but may alternatively be displayed in any suitable manner. The metadata or context of the card 130 or of the stream is preferably used in the query links 126. Links in the content may be converted to query links. Query links 126 in the card 130 preferably result in a subsequent card 130 being added to the query stream. In some instances, cards 130 may be replaced or animate to a replacing card when a specific type of query link is activated within a card. Such query links 126 will herein be referred to as transition query links. Transition query links will typically be used when a query was unable to narrow the service results to intended content. For example, if a query is "Yelp Starbucks in San Francisco", the results may include numerous store locations, which can be displayed in the content of the result card. When a user selects one of the cards, instead of creating a new card, the content of the card may be replaced with the query results for that specific store location. When a module query tool 120 is used, a query result card 130 can be presented for the current query. In one implementation, the query result card 130 is not automatically added to the stream. The query result card 130 can be accompanied by a selectable option (e.g., a button) to save or add the card 130 to the current stream or a different stream. In the case, that a result card includes a set of transition query links then the save option may not be displayed. Cards 130 may additionally include input fields or controls to refine queries.

A query engine 140 functions to perform a service query and retrieve data for a query response. The query engine 140 preferably includes a query classifier 142, a service API module 144, and a query data processor 146. Queries are preferably submitted to the query engine 140 from one of the query tools 120. The query classifier 142 preferably identifies a service specified in the query object. For example, in the query "Yelp Slanted Door", the first word "Yelp" is preferably identified as the service and "Slanted Door" is the argument of the yelp query. In some situations, a query will not specify a service. The query classifier 142 preferably includes an entity component (e.g., a database or server) that performs or facilitates a search for the arguments, and from that deduces a suitable service. For example, the argument "Slanted Door" may be stored as an entity with a classification as a restaurant, physical address, ids to services that provide information. The entity component may build up data through use of the query platform system. The query classifier 142 may additionally aid in auto-complete/suggestions for the query bar, for service recommendations, and other suitable features.

A service API module 144 preferably performs an API query in response to a submitted query. Each service implementation preferably includes a service API module 144 that defines how a query should be made. Since outside services have a variety of ways of providing access to information, each service preferably utilizes a custom service API module 144. An API server preferably hosts one or more service API modules 144. An API server may be configured to support a subset of the set of all supported services. A manifest can be generated from the API servers and supported API services, such that queries may be routed to the appropriate API server from the query classifier. A service API module 144 preferably defines at least the process, routines, and method in which the query platform retrieves data from outside services. Preferably, a service API module 144 is configured to communicate to a service through an API provided by that service. Alternatively, the service API module 144 may be configured to communicate with the service and retrieve data through alternative interfaces such as by scraping user interfaces, simulating application use, automating user queries of the service, or through any suitable manner. Additionally, a service API module 144 may be a meta-service that is configured to communicate with a plurality of data sources. For example, a "movie" service may pull movie information from IMDb, reviews from Rotten Tomatoes, and show times from Fandango, and combine all the data into a single result card for a single query. Similarly, a plurality of result cards may be generated for a query of a service API module 144. Furthermore, one service API module 144 may access at least a second service API module 144 to retrieve supplemental information. The service API module may additionally specify or determine at least a subset of the recommended query links included in a result card. In an alternative embodiment, the system may be implemented with a single service. For example, a single service provider may implement the system for performing contextual searches of internal information. The service API module 144 will preferably interface internally with the service either through an API or directly with the data resources. The query engine 140 may alternatively be modified in any suitable manner to accommodate a single service or limited set of services. Additionally service API modules 144 may manage local databases. The local databases can be stored or collective knowledge that may be inserted into result data of a result card. For example, a movie service may learn upcoming movies and insert such information in related result cards. The local database information can further be used for processes such as auto-completion.

A query data processor 146 functions to interpret the results of a query. In some situations additional communication with the service may be required. The query engine 146 preferably returns the most appropriate data for a query. Thus multiple API calls may need to be made to the service to refine the results. In one example, a service API module 144 may return a redirect instruction to another service API module 144. The query data processor can facilitate the redirection to the other service API module. For example, a movie service may recognize that the query "movies The Office" should be sent to a TV service, and the query data processor 146 may direct the query to the TV service API module 144. Similarly, a service may be down, return corrupted information, return an error message, or act in an unexpected manner. The query data processor 144 can preferably be configured to detect data anomalies and take appropriate action. In one case, the query data processor 144 may direct a user to an alternative/backup service API. Additional arguments and metadata may be used in refining the results of a service. The query data processor 144 may calculate additional metadata to add to the result data. The metadata may include fields such as location, thumbnails, tags, reservation information, etc. The query data processor 144 may additionally use a recommender to identify suitable services to include as recommended query links 126.

A card renderer 150 functions to generate a result card 130 to add to the card stream interface 110. The card render 150 preferably receives the data results from the query engine 14o. The data can be characterized in a data serialization/interchange object, preferably as JSON, but any suitable form of data modeling may alternatively be used such as XML, OGDL, YAML, CSV, or any suitable format. Card templates may be used to determine how the data is rendered. There may additionally be a variety of templates for different conditions. For example, a set of templates may be for the authoring account, collaborators on the stream, and public viewers of the stream. The result data applied to a template preferably generates display instructions for the card 130. In one variation, this is preferably HTML markup specifying the content. In another variation, this may be data instructing how native views should be constructed in a native application.

A social account layer 160 of a preferred embodiment functions to enable multiple accounts to interact with content of a search stream. The social account layer 160 preferably supports multiple accounts. Users, applications, or other entities can preferably register for the query platform or alternatively interface with an account system with an outside system for authenticating and initializing accounts. An account can preferably create, view, collaborate, and/or interact with a search stream. An account can preferably generate a plurality of search streams that are stored in a collection or collections. As the query platform is used by a plurality of accounts, queries and/or result cards 130 may be cached for use by subsequent requests by other accounts, which functions to improve the latency and responsiveness of a card stream interface 110. The social account layer 160 is preferably used to enable unique applications on top of search streams generated by accounts. The social account layer 160 can enable copying of search stream content, generating a search stream from a template, sharing search stream content, embedding search stream content, collaborating with other accounts on a search stream, or using a search stream in any suitable manner.

2. Method for Generating a Contextual Search Stream

Figure 6:
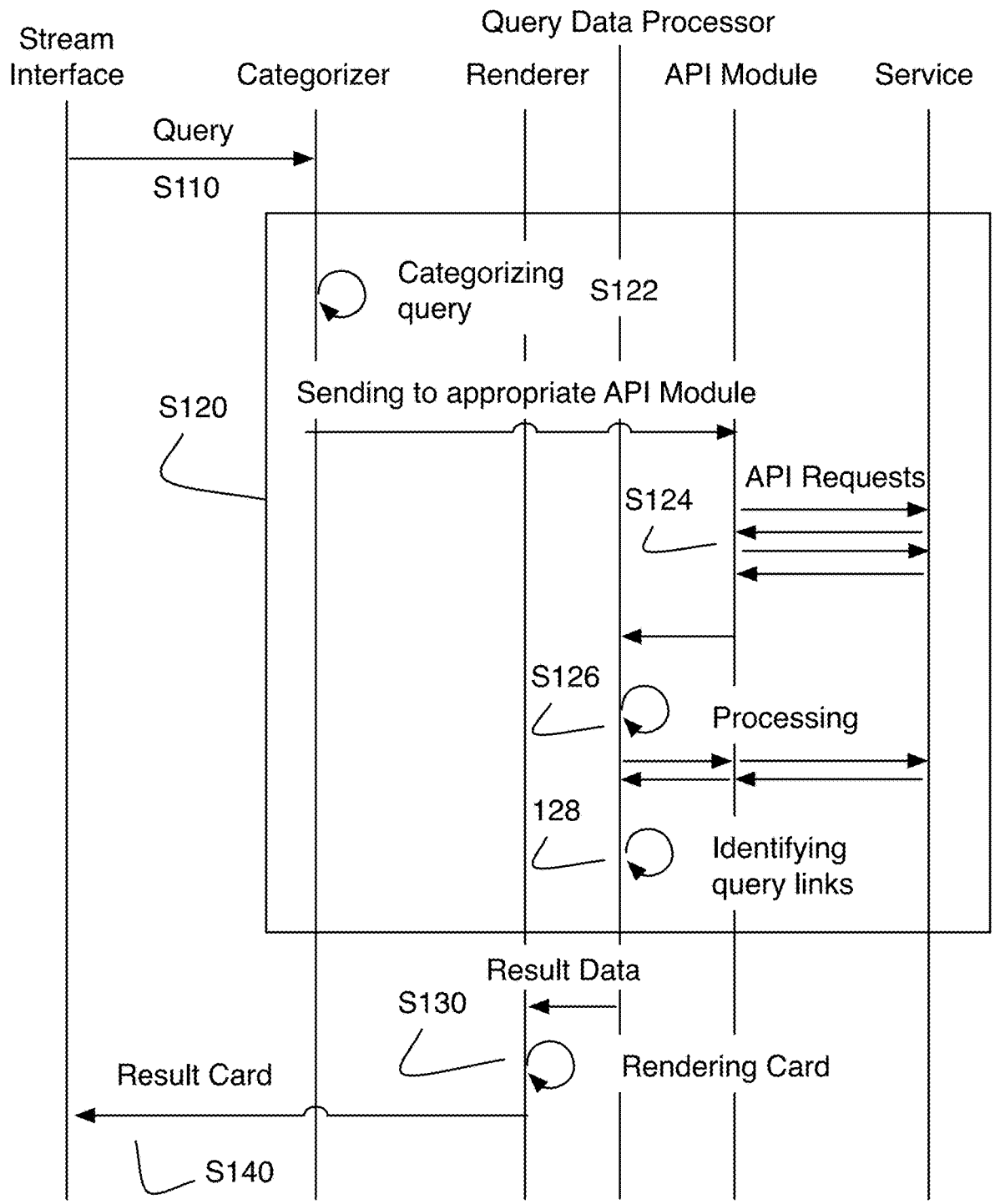
FIG. 6 is a communication schematic of a method of a preferred embodiment.
Figure 7:
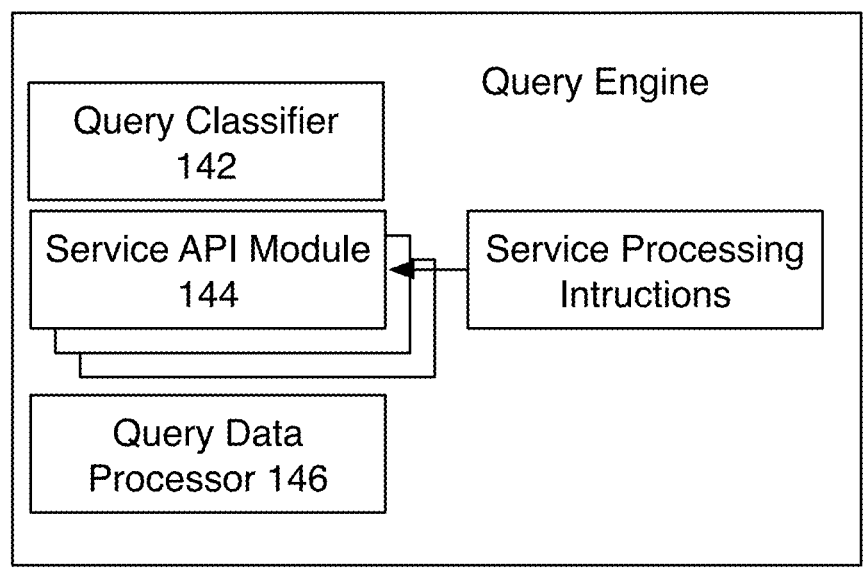
FIG. 7 is a schematic representation of variation of a query engine receiving service-processing instructions.

As shown in FIG. 6, a method S100 of a preferred embodiment can include receiving a query input S110, retrieving result data of the query S120, rendering the result data into one or more result cards S130, and adding the card to a stream S140. The method functions to use a plurality of services to enable a search stream interface. A search stream is preferably a collection of related service queries. The method preferably organizes the stream into a single window of cards such that previous queries can be quickly and efficiently viewed. Typically, at least two cards in the search stream share contextual information, such that a query of one service is generated at least in part from the content/results of a first query. Contextual information form one or more cards, the stream as a whole, and/or multiple collections can be used as sources of context, which can be compounded and refined through continued use of the query platform. The method of the search stream preferably has numerous applications such as planning an itinerary, researching people, researching places, researching products or topics, making lists, creating a collection of related information, or any suitable application. Method S100 is preferably performed within a provided query platform that includes a query tool and a collection of result cards, but any suitable system may alternatively be used.

Block S110, which includes receiving a query input, functions to obtain a request for information from a user. The query input is preferably received through one of the query tools described above, a query bar, navigational search interface, or a query link. The query input may alternatively be supplied through any suitable source such as an alternative query tool or an API of the query platform. A query input is preferably in a query syntax normalized across a plurality of external service providers. A query preferably includes a service identifier and service arguments. A query input can be directly entered by a user or supplied through a query link. A query input can alternatively be a processed version of a semantic query input. Additional contextual information may additionally be added to the query, such as location, user account identifiers, query history, and the like. Location information may be added by using location information obtained from the device using GPS, cellular triangulation, wi-fi location identification, or any suitable location detection technique. Location information may alternatively be added using location information of a card in the stream. In one variation, a query link of card may be activated. The card may include location metadata for the card or for that particular query link. Contextual information can additionally or alternatively be applied while retrieving result data of a query input, when processing the result data.

Block S120, which includes retrieving result data of the query, functions to access a service to fulfill the query. Retrieving result data of the query may include classifying the query S122, retrieving result data through a service API S124, and optionally processing result data S126. In one preferred embodiment, the result data is retrieved from at least one service selected from a set of possible services. In an alternative embodiment, the set of services may be composed of a single service. The set of services preferably includes external services. In an alternative embodiment, the result data may be retrieved from an internal service and/or retrieved from internal data resources or processors. In one variation, retrieving the result data is performed continuously as the query is edited. Predictions or suggestions for the query based on the current state of the query can be generated and rendered for user selection. The predictive query results can be suggested query terms based on query patterns made within the system, but the suggested query terms may alternatively be pulled from autosuggestions pulled through an external service. Additionally or alternatively, result cards can be shown in part or whole in a predictive manner based on the currently predicted query.

Classifying the query S122 of a preferred embodiment functions to determine an appropriate service or services to collect data from. A query received in Block S110 preferably includes a service. In one embodiment, services are preferably specified at the beginning of a query, but may alternatively be specified in any suitable part of the query. For example, a query of "movies Casablanca" could be a query identifying to use the movie meta service to fetch a result card on Casablanca. If a user were to select to query a particular service, such as IMDb, then the query could be "IMDb Casablanca". When a query is identified, a server preferably routes the query to an API server configured for communication to the identified service. If a service is not identified, classifying the query may include identifying an entity record from an entity module that corresponds to at least one of the query arguments. The entity record will preferably be a data model of an argument, which will include parameters that specify a type of service, a specific service, or a set of possible services. If such an entity record is not identified or does not include a suggested service, classifying the query may include performing a semantic search. In one instance, a query input is a freeform user query input, which specifies desired results in a semantic manner. A freeform query input can be classified into a normalized query input. In a semantic search, parameters of the entity record and/or the query arguments may be used to identify a suitable service through general services such as a search engine, informational resource (e.g., Wikipedia), or other services. For example, a query may be classified by initially querying a search engine. If the query was just the name of a restaurant, results of the search engine may include a number review sites and/or restaurant related sites. A restaurant service may then be selected for the query. A query may alternatively be classified for a particular service in any suitable manner. A semantic search can additionally apply contextual parameters, query history, collection status, user profile data, and other suitable properties to instruct execution of the semantic search. A semantic query can be formatted into a normalized format that is consumable by a service API module. Once a query is classified the query is preferably routed to a suitable service API module that is configured to handle querying a particular service. Additionally or alternatively, a query may be routed to multiple service API modules to obtain data from multiple services.

In some cases, the semantic search engine may not be able to effectively classify a query and/or require disambiguation. If a query is ambiguous across multiple services, one possibility is the query is executed using the path/service that contains strongest match. The workspace interface would then display the result of that query, but also a disambiguation display of some sort to allow the user to refine that query. In another case, if there is no strong match, the user may be prompted to refine the query by specifying a category or service to scope the search. The display of this "disambiguation" module to the user may vary. In one implementation, the disambiguation module could appear as categorical tabs that exist on top of a result card. It could be a dropdown menu. It may always be present in the query workspace, or we may show it only if there is need for disambiguation.

Retrieving result data through a service API S124 of a preferred embodiment functions to communicate with a service provider. Each service provider will preferably have a unique API and thus a module can be created to target each service provider. Retrieving of result data for a query input is preferably made through an external service that is mapped to the query input. The mapping is preferably established through a service identifier specified in the normalized syntax of the query input. Additionally or alternatively, an appropriate service can be mapped through classifying the query. A service API module preferably specifies how arguments should be formatted and integrated into the API requests to the service. When communicating with a service provider, a plurality of API requests may have to be made to retrieve the intended information. In an alternative embodiment, result data may be collected from services without an API by scraping user interfaces, simulating application use, automating user queries of the service, or through any suitable manner. In one variation, a service will preferably be a meta-service that may collect data from a plurality of API's or scraped services. A meta-service preferably generates a card from multiple sources. For example, a "movie" service may pull movie information from IMDb, reviews from Rotten Tomatoes, and show times from Fandango, and combine all the data into a single result card for a single query. In another variation, a particular service may require account authorization. The query platform can negotiate authentication/authorization prior to performing any queries with the service (e.g., using OAuth or any suitable authorization process); authentication tokens or other credentials can be used to query the external service using the account of the user. For example, a user may be able to make queries against a financial service of which they have another account. The user will add the financial service account to his or her account on the query platform, and then when querying the financial service the personal data can be returned. Additionally, processing result data in Block S126 may necessitate subsequent communication with the service to refine the result data.

A method of a preferred embodiment may additionally include processing result data S126, which functions to manage the data responses of a service. Result data is preferably processed into normalized result data. Normalized here defines the interoperability of the data to be displayed in a formatted result card. In some cases, related services can be interchanged depending on user preferences or other conditions. Processing result data may include analyzing the result data and determining if results match expectations of the query. In some situations, result data may be able to be automatically refined to increase the relevance of the data presented in the card. For example, a query for a particular store may initially return a list of store options. If a single match of the store name is found in the results, then the service may be queried again to retrieve information for that particular store. Similarly, context data of the search stream may be used to refine the relevance of data. For example, if there are multiple matches but only one with location corresponding to location information of the search stream, then the service may be queried again to retrieve information for the nearby store.

Processing result data may additionally include identifying recommended actions of the card S128. The recommended actions are preferably enabled through recommended query links when the result card is rendered. The recommended query links may be based on service provider, type of query, specified query links, automatic analysis of result data, or based on any suitable aspect. Additionally, when processing results, the query platform may additionally be updated with information from the result data to improve future queries. For example, query results may be cached and entity records updated. In one implementation, a result card can be associated with a single canonical entity representing the resulting data within the query platform. The single or centralized entity model can afford greater cohesion between collections that include the same query. Updates to the single entity can result in updates to the result card in other collections. In another implementation, a result card can be associated uniquely with the collection. In this variation, a first result card of a query can be distinct from a second result card of the same query Block S130, which includes rendering the result data into a result card, functions to convert the data of the service to a normalized display graphic, interface, or presentation. The result data is preferably in a serialized data format such as JSON. The result data is preferably applied to a card template. Each service can have multiple card templates. Card templates may be dynamically selected for rendering based on conditions. In one situation, a card template may be selected based on the viewing device (e.g., desktop template vs. mobile template). In another situation, a card template may be selected based on viewing privileges of the account accessing the card (e.g., author card template, contributor card template, public access template). Rendering the result data into a result card preferably generates HTML, that is transmitted to a client device. Alternatively, display code may be transmitted to an application, which then interprets the display code to natively display the card.

Block S140, which includes adding the card to a stream, functions to add the rendered card to a search stream. The search stream will preferably be built up from a plurality of queries. New search streams may be started at any point in time. An initial query will preferably result in a first result card being added to the search stream. Subsequent queries will preferably be added to the stream. All cards are preferably accessible and persistent when viewing a stream, as opposed to displaying the cards in separate windows. The method may additionally include providing a navigational list interface, which enables a collection of cards to be viewed and navigated. Preferably the cards are organized in a scrollable vertical or horizontal linear list of cards. The cards may alternatively be organized in a grid, cover flow, stacked list, or any suitable arrangement of card objects. In one variation, a result card may be added to the top or bottom of the search stream such that result cards are ordered chronologically according to query order. In another variation, a result card may be inserted into the card stream with associative proximity to an originating result card. For example, if a query link of a first card generates a new card, the new card may be inserted into the search stream above the first card. Additionally, the card stream may be configured for networked organization of cards. Cards may be organized in a tree or connected network of cards. Cards may alternatively be organized in any suitable manner. Result cards in the search stream may additionally be minimized, removed, repositioned, refreshed (e.g., update to current information), edited (e.g., altering the query of the card), or modified in any suitable way.

Figure 8:
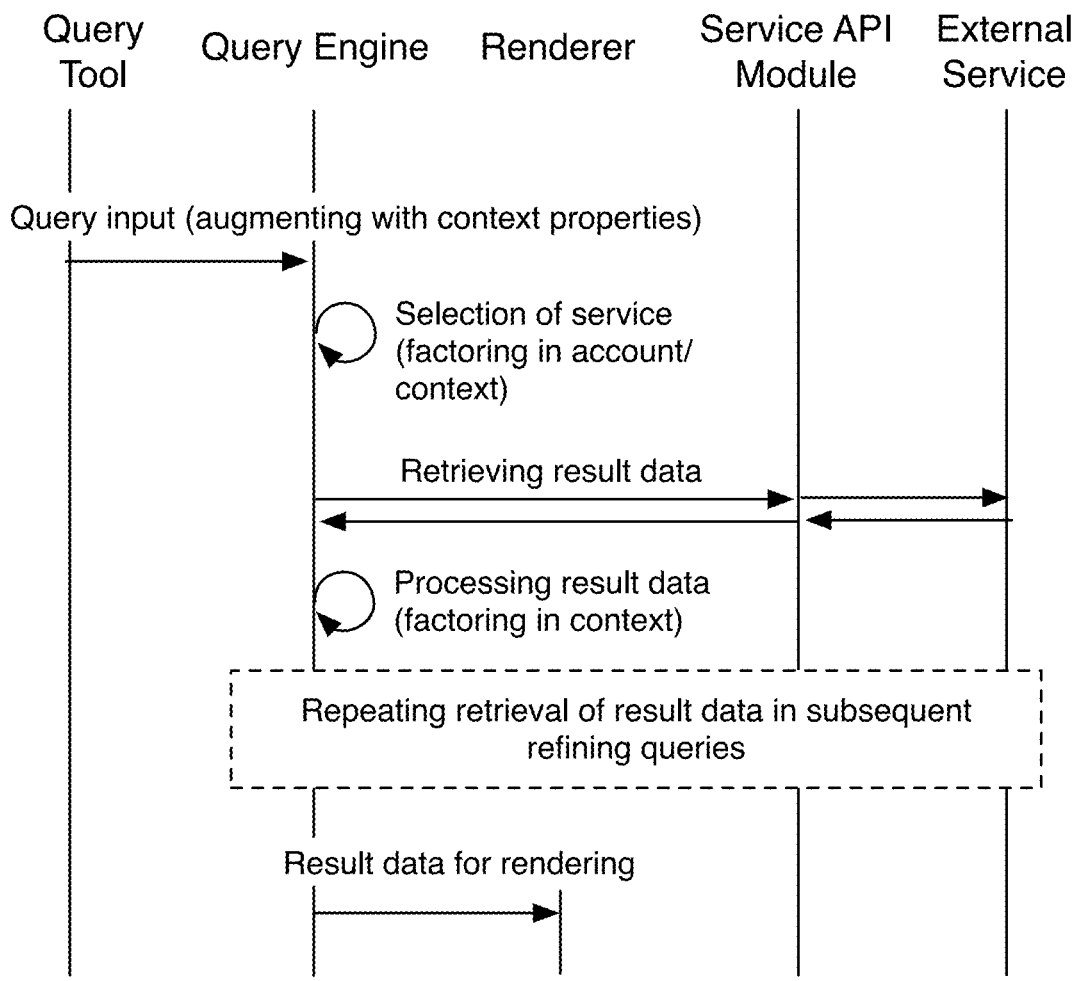
FIG. 8 is communication flowchart of adding a subsequent result card according to context properties of the collection.

The method is preferably performed iteratively to construct a stream of a plurality of cards. As mentioned before, the context of one card obtained by a first service can be used to impact the query of a second service and results of a second card in the stream. Adding a subsequent card to the stream can include retrieving from a second external service provider API result card data, wherein the result data is retrieved according to the context parameter of a parent result card, another result card in the stream, the context of the stream, or any suitable context as shown in FIG. 8.

Context may additionally or alternatively be provided or supplemented by other factors such as user account information, current location, access to particular services, preferences, personalization of service, or other suitable information. Context properties can be used to modify the query input. For example, location information can be transparently added to queries made to a service. Context properties can additionally or alternatively be used in selection of a particular service. Context may additionally or alternatively be used when processing result data from a service. For example, context properties may be used to invoke a filter on a result data to refine the result data to contextually appropriate data. The context properties can additionally be used during subsequent refining queries. Performed iteratively, the method may eliminate the task of entering redundantly supplied information for different services. For example, may services will need to know location, date, and time information for a query. Such information may be obtained explicitly (e.g., user entered data) or inherently (e.g., selection of a movie time at a particular theater indicates time and location).

Additionally or alternatively, a method of a preferred embodiment may include receiving service-processing instructions, which functions to enable adding customized services to the query platform. In one exemplary use-case, developers may develop a service API module, card templates, service name, related services, and/or other suitable components. The developer preferably submits such components in a service-processing instruction set. The service-processing set preferably specifies how to retrieve information from a service and at least a template to be used with the returned data. The developer may additionally register a service name within the namespace of the query platform. Users can then use that service by using the registered service name in a query. The developer may additionally provide a list of related services or related queries to be used in recommended query links. Alternatively, recommended query links and query categorization may be at least semi-automatically generated through content analysis. In one variation, the query arguments used in previous uses of the developer service may be matched against classifications in the entity module. The query platform can use machine learning and other data analysis techniques to predict similar services and queries. Customized services can preferably be fully integrated into the query platform. By enabling outside entities to create and integrate new services, the query platform can grow to supply an ever-increasing range of data formats. Services may additionally be monetized by accounting, metering, charging, measuring, or monitoring usage of a particular service.

3. Method for Interacting with a Contextual Collection

Figure 9:
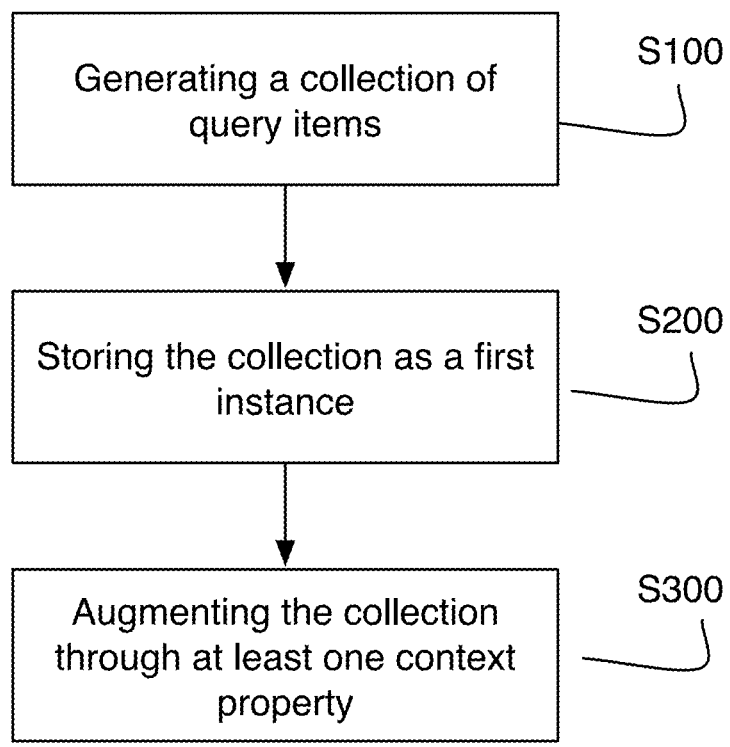
FIG. 9 is a flowchart representation of a method of a preferred embodiment.

As shown in FIG. 9, a method for interacting with a contextual collection of a preferred embodiment preferably includes generating a collection of query result items S100, storing the collection as a first instance S200, and augmenting the collection through at least one context property S300. The method functions to enable a variety of use cases for collections/search streams. The method is preferably implemented by a query platform system as described above, but may alternatively be implemented by any suitable system. The collections are preferably created and managed within a single query platform, but collections may alternatively be hosted on a variety of platforms or devices. The method and related variations are preferably applied to a collection of result items (e.g., cards) as above. However, the method for interacting with a contextual collection may alternatively be implemented for any suitable collection of digital items created through any suitable means. The collections preferably initially include contextual metadata or properties, which can be explicitly shown in the representation of the result items or may be transparent to the representation of the result items. Additionally, the digital items preferably have a data source, and more preferably a data source responsive to a set query input associated with the particular digital item. The method can have particular applicability to collections of dynamic items that can be updated (e.g., repeating a query), redirected (e.g., using a different external service), modified (e.g., altering the context properties or query terms), or altered in any suitable manner. The method can include a variety of variations that may be employed within an ecosystem of users and collections in any suitable combination. As one preferred embodiment, the method for interacting with a contextual collection can involve extracting contextual information from the result items and presenting collection summary content. In another preferred embodiment, the method for interacting with a contextual collection can involve altering representation of the result items based on the viewing user account. In a related embodiment, the method for interacting with a contextual collection can involve duplicating the collection and updating the result items based on the viewing user account and/or directives delivered when copying the collection. In one preferred embodiment, the method specifically functions to enable multiple accounts to share, interact, access, and otherwise use accessible collections of query result items.

Block S100, which includes generating a collection of query result items, functions to create a collection of cards compiled with data from various services. The collection is preferably created through a query platform described above and/or through the method S100 described above. The collection is preferably a series of result items (e.g., result cards) that are generated through queries of at least one service and more preferably selectively from a set of external and internal services. The collection (i.e., a search stream of query result cards) can be ordered and arranged in any suitable arrangement. The collection is preferably generated through queries by at least one user, a collaboration of a plurality of users, or any suitable participants. Each query is preferably converted to an API service request (e.g., through an API of a service provider or through scraping content from a webpage) that is converted into result data and then subsequently rendered into a graphical representation of the result data. The queries and the data associated with the result cards preferably provide context data for the collection. The context data (i.e., metadata) of a result card may or may not be presented in the interface representation of the result card. Additionally, between any two cards there can exist an associative trail of metadata, where context of one card is used to augment or modify another card. Additionally, metadata can be generated from processing the collection of cards in the stream. In one preferred embodiment of generating a collection, context data of one card is used in querying a service for data in a second card. For example, the location information associated with an initial result card may be used in querying restaurant information from a second service for a second result card.

Block S200, which includes storing the collection as a first instance, functions to save collections for future use. The collection at a first instance can be the collection at particular time, location, as viewed by a particular account, or any suitable contextual instance. As described in block S300 the collection can change between different collection instances (e.g., when viewed by different users, when copied to other/collections accounts, when automatically updated by the query platform, when shared with different groups, when used as a template to generate other collections). The collection is preferably saved and credited with an original authoring account. An account can preferably save a plurality of collections. A collection may be saved for private access by only the authoring account, for collaborator access, for invited viewer access, for public access, and/or any suitable defined viewing and contribution access. A saved collection can preferably be edited and modified after being saved. More preferably, collections are continuously saved at least for private viewing. Collections may include a publish or share action in which the collection access will be changed. A URI is preferably designated for a collection.

The result cards of a collection are preferably cached. In one variation, the rendered result cards are cached (e.g., the HTML). In another variation, the result data is additionally or alternatively cached (e.g., JSON data). In one preferred embodiment, the result cards are static and remain constant for subsequent views of a collection. Caching such cards can reduce the processing required to display a full collection. Additionally or alternatively, some cards may require refreshed or live data for a card, and cached queries performed on behalf of other accounts, and stored classification may provide efficiencies in querying outside services. Similarly, a query result card can be individually stored for a particular collection and/or user, but alternatively a canonical result card can be maintained for corresponding queries made by other users. For example, a single version of a result card can be maintained for the query of "Movie Casablanca". Whether the result cards are canonical versions or individualized versions, result cards can be a live version (updated at the time of loading the stream or live to within a certain time frame such as the past hour) or the result card can be a historical snapshot. For example, a stock quote result card can be stored as a live view showing the current status of the stock or the stock quote can be stored as a historical record from a particular day or time period. Furthermore, storing result card data can support result card rollback, so the historical record of a result card can be explored.

As one exemplary data model architecture that supports canonical result cards, a collection data object can store an array of items that include result card references. Each item could store a pointer to a canonical data object entity representing the presented data of the result card and optionally any related metadata. An item can additionally store any stream specific related result card information such as comments, captions, social promotion records (e.g., a count of favorites), a time stamp of when it was added to the stream, and/or any suitable information. The collection data object can additionally store collection level information such as the title of the stream, the sharing setting configuration, extracted metadata, and other suitable information.

As an exemplary data model architecture that supports individual result cards can be substantially similar to the above data model, but instead of storing references to the result card, a result card data model can be stored for each item. The result card data model can include any media resource data or references, parameter values (e.g., description text), metadata (e.g., location, selected time windows, and the like), tags, query links, and/or any suitable parameters.

Block S300, which includes augmenting the collection through at least one context property, functions to enable actions and interactions with a collection during subsequent access. Numerous forms of access may be enabled, but the access may involve sharing, multi-user access/collaboration, embedding, generating other collections, modifying collection based on condition of the access, automatic transformation of the interface relating to the collection as the collection is updated, and/or any suitable feature. Augmenting the collection can function to conditionally update the collection. A collection may be displayed differently based on time of viewing, the viewer of the collection, the location information of the viewing device, the type of device/application on which the collection is viewed, the type of information in a card of the collection. The different modes of augmenting the collection may be performed in combination or at different times within a query platform.

Once saved, a collection will typically be accessed at a future time and possibly by another user. The conditions of viewing the collection can modify the collection. In some cases modifying the collection may involve applying a specific template, but in other cases it may include altering the content of a result card. In one situation, the content may be refreshed by performing the query a second time. In another situation the query may be repeated but with a different service. The different service is preferably based on preferences of a viewing account. For example, a collection author may use one preferred service for restaurant reviews, but a second account has preferences set to use a second service for restaurant reviews. A card with a restaurant review may be refreshed to show the content of the second service for the second account. The automatic selection of user-preferred services to generate a result card can be particularly useful when the type of services rely on personal accounts with the external service (e.g., a financial information service, a social network service, etc.). In another situation, the query may use alternative meta data that provides context to a query such as location, time, dates, people and the like.

The collection used in the method can include live and/or static result cards. In a variation, where a result card of a collection is a live result card, then augmenting the collection can include updating the result data of the result card at substantially the time of presenting the collection. A collection can additionally include a combination of live and static result cards. Preferably, a result card may have the option to be selectively set as a live or static. Alternatively, particular queries, services, or templates may be pre-configured to set a result card as a live result card or a static result card. Static result cards preferably have associated result data from a service cached such that the query is not repeated even when displaying the result card to other users in other browser or application sessions. Live data preferably updates at least a portion of data on the result card once for each viewing session. For example, a stock result card, may want to update the stock price to reflect a substantially live state of the stock price. Live result cards may be partially or fully live. A partially live result card updates only a portion of data on the result card (e.g., the stock price and not company information). A live result card preferably has content data streamed, continuously updated, periodically updated, or updated in any suitable manner to reflect live data. Live data is preferably obtained through making repeated query requests. Alternatively, live data may be obtained through using a live data feature of a particular service such as establishing an event subscription or configuring messages to be routed, pushed, or sent to the result card. Alternatively, live data may be retrieved for each loading of the collection. For example, refreshing a webpage with a collection will preferably result in a querying a service for updated content of a result card. In a similar variation, a collection may be made live such that result cards are dynamically added based on external factors. For example, a collection may be linked with a location check-in application, and every time a user checks in to a location, the query platform is notified and the collection is updated with a result card for that location. In this way, the content of the collection is made live not just individual result cards. A live card may additionally be stored and/or managed differently from a static result card. In one variation, a live card is stored once globally and other live cards for the same query reference the global live card. For example, a live result card on a particular stock will reference a global live result card that is maintained a single time within the system.

Figure 10:
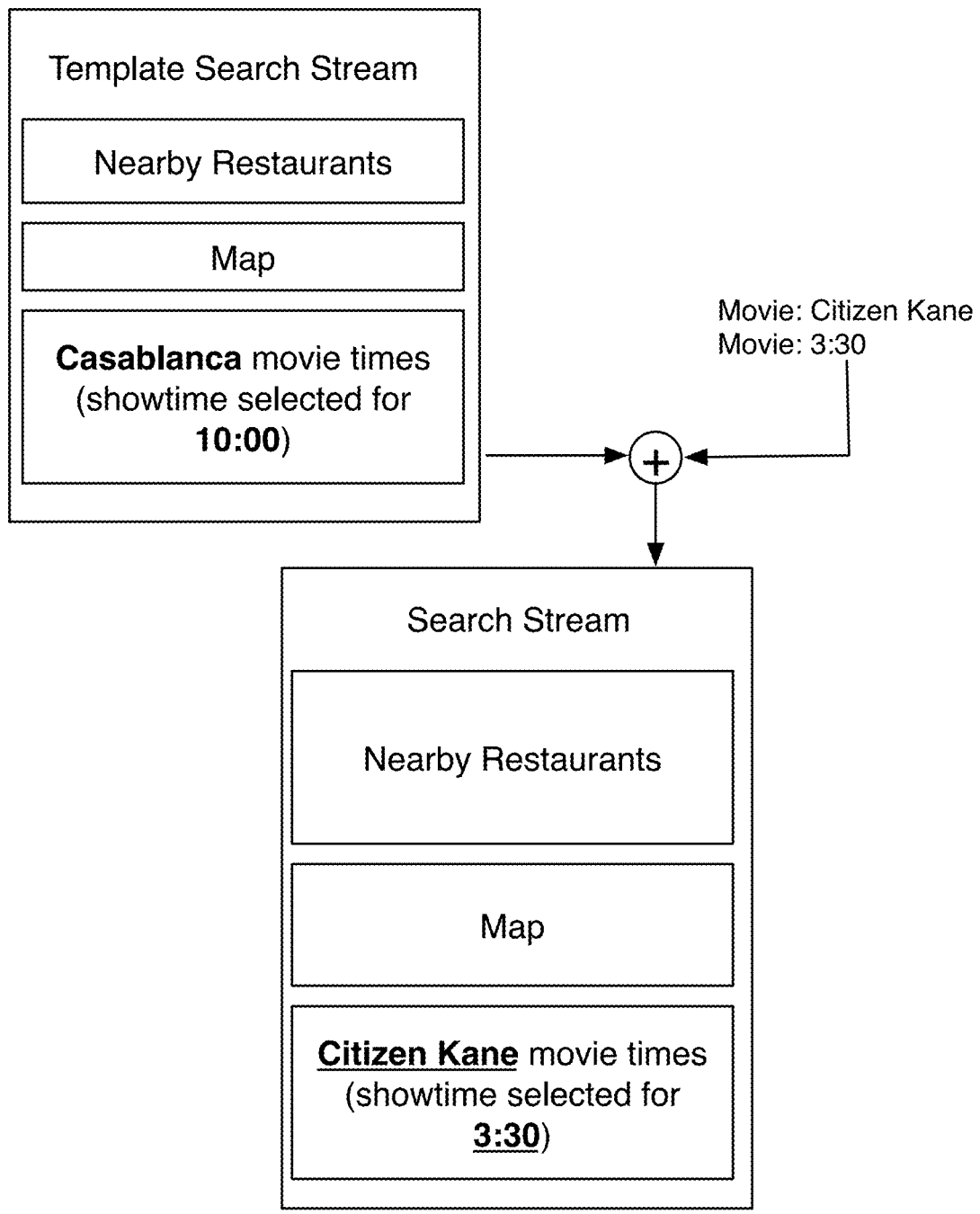
FIG. 10 is a schematic representation of generating a template search stream.

Additionally or alternatively, a second instance of a collection may include creating a template from the first instance of the collection, which functions to make the sequence of queries in the collection to be replicated for other scenarios as shown in FIG. 10. Typically, particular parameters of a collection may be designated as a variable, and any cards dependent on the context of that card will be tied to that variable. More specific, the queries of one result card can be dependent on context variables and metadata of originating cards. The result cards dependent on altered context cards can be regenerated with a new query. Collection templates are preferably useful for allowing users to quickly generate a whole stream by updating only a minimal number of fields. The collection template may be generated automatically from an existing collection. Alternatively, a search steam template may require at least partial user interaction to define the variables of the template. For example, a collection may specify an itinerary for a movie night. A first card preferably specifies a movie and show time, a second card is a map of the movie theater, and a third card lists nearby restaurants to the movie theater. The movie and show time may be set as template variables. A user using the template card to make second collection may be guided in selecting a movie and a show time. The query platform can use those template variable responses to create a query stream with similar types of cards as the original template collection but using queries with the selected movie and show time (i.e., the map card and the restaurant card will automatically be generated from the context information of the selected movie showing). In one implementation, cloning, copying, or forking a collection can result in presenting a user interface with automatically selected customization variables. For example, location, time, item selection, search terms, and other information can be pulled from the original collection as optional variables. The extracted variables can then be presented to the user to edit. After committing the edits, the new collection is updated and populated with new result cards. In an alternative implementation, the collection is directly copied to a new collection instance of the same or a second account. As described above, a collection can include a child result cards wherein the child result cards depends on at least one context variable of a parent result card and/or a stream context card (extracted through patterns of at least a subset of result cards (e.g., average geographic region). In a user interface with user selected saving of result cards, context variables can exist from hidden result cards that led to a saved result card, but where not themselves saved to the collection.

Figure 11:
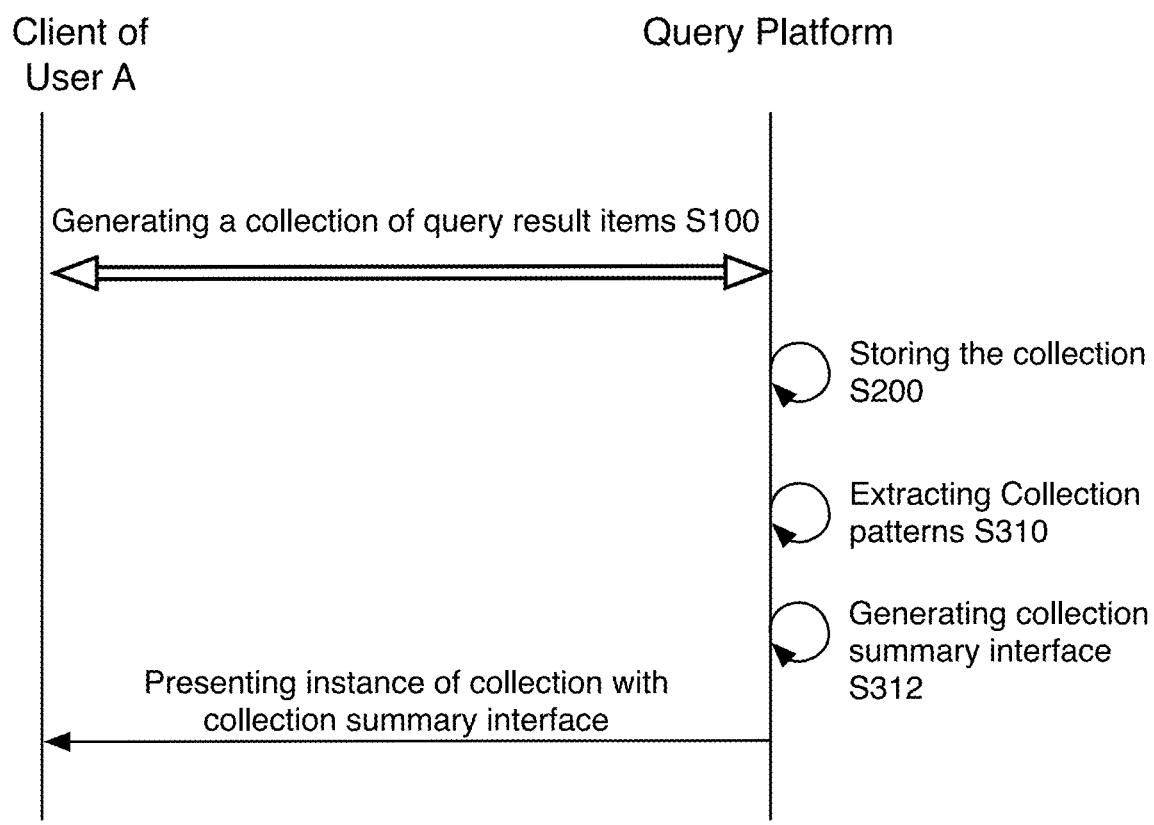
FIG. 11 is a communication flowchart of a variation generating a collection summary.

Augmenting the collection may additionally include extracting patterns from a plurality of cards S310, which functions to detect context patterns created by at least a subset of result cards in a collection. The extracted patterns can be used in generating a collection summary from the extracted patterns S312 as shown in FIG. 11. The collection summary can be a query actionable content, where query actionable describes the property of the collection summary to take an action in direction to at least a subset of the result cards. The query actionable content can be a purchase interface, a calendar scheduling tool, a travel planning tool, or any suitable tool. The summary is preferably constructed as a collection is constructed or after a collection is constructed. In one preferred variation, the collection is analyzed and emerging patterns are identified after each action in the collection. Meta data of the cards is preferably used in creating the summary. A plurality of patterns may be configured for different situations. The cards and the meta data of a collection is preferably analyzed, and if the collection matches at least one pattern, then a collection summary may be generated and displayed. Patterns may include a plurality of cards with a time attribute, location attributes, price attribute, people attribute, classification attribute (e.g., restaurant card, music card, video card, product card, etc.), service attribute, or any suitable attribute. A related variation can be used when multiple collections are associated with the collection. For example, multiple collections are associated with the collection through the account when an account created, follows, or interacts with other collections. Patterns and context information can be extracted from these collections as well and used to supplement or contribute to the collection summary. The summary may additionally provide additional actions such as recommended queries and particular actions. Some exemplary actions may include performing a bulk action on a plurality of items such as purchasing, performing a service-specific action on a group of items.

Figure 12:
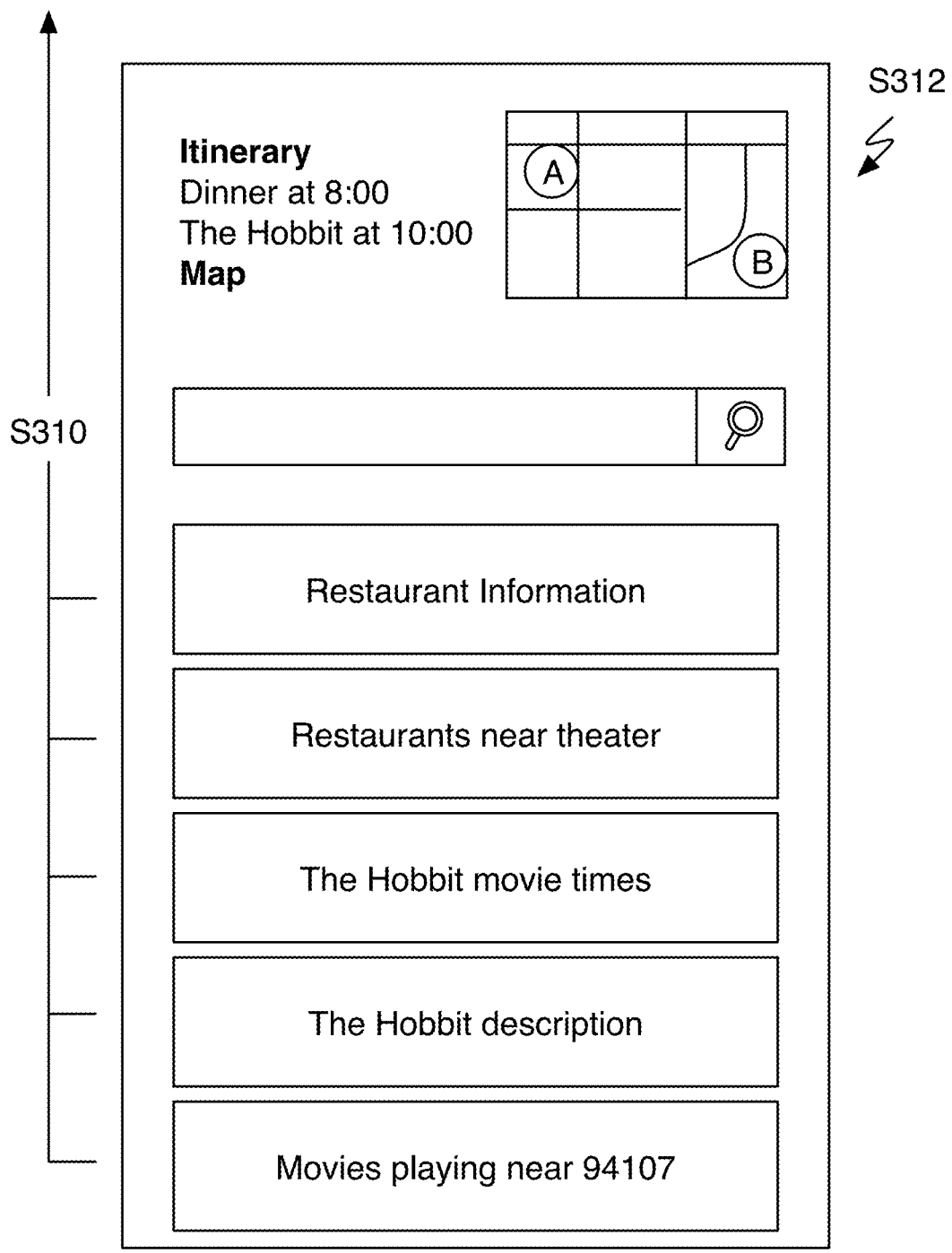
FIG. 12 is a schematic representation of a variation of a preferred embodiment including extracting patterns from cards of a search stream.
Figure 13:
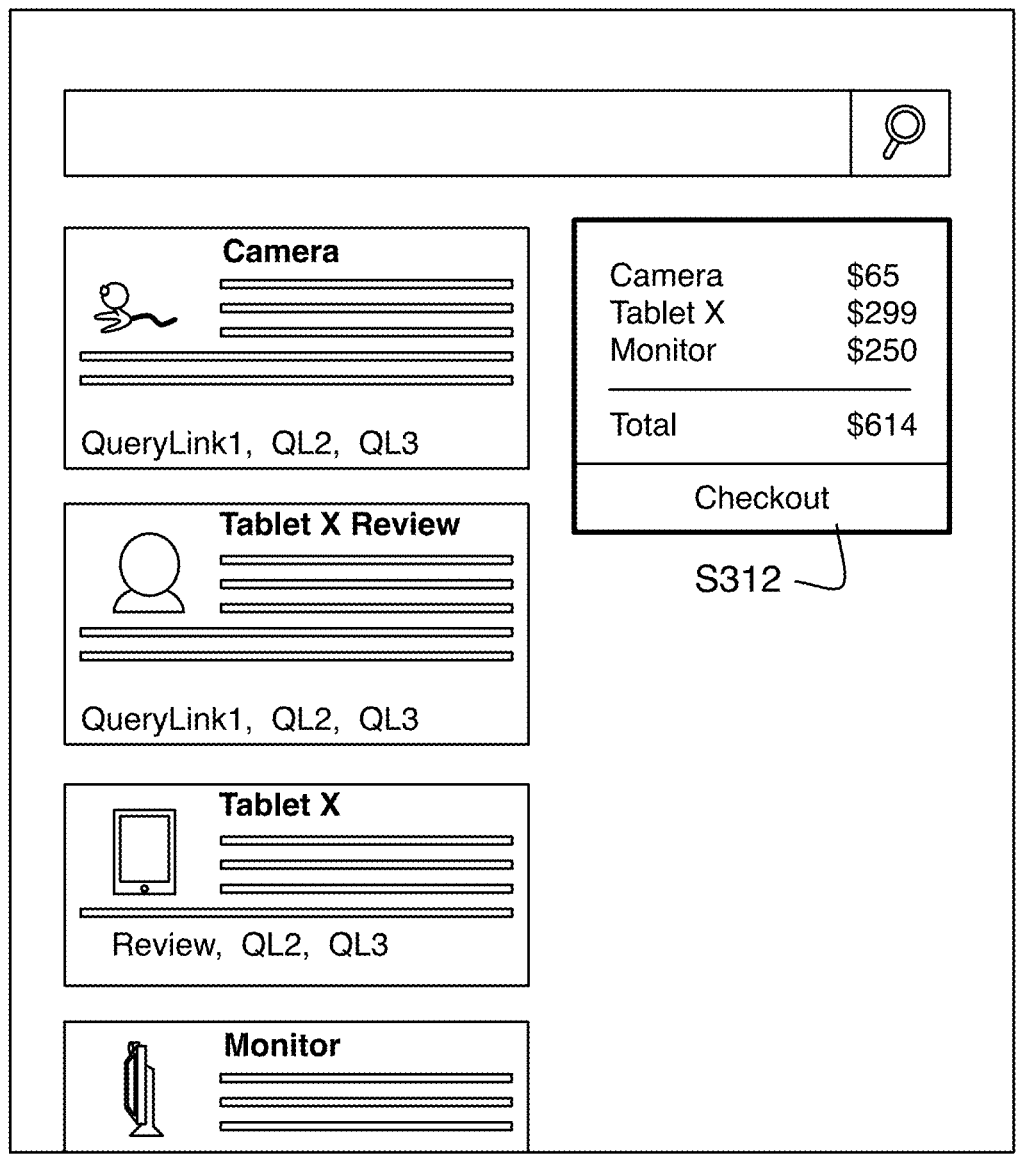
FIG. 13 is a schematic representation of an exemplary implementation inserting a product purchase interface.
Figure 14:
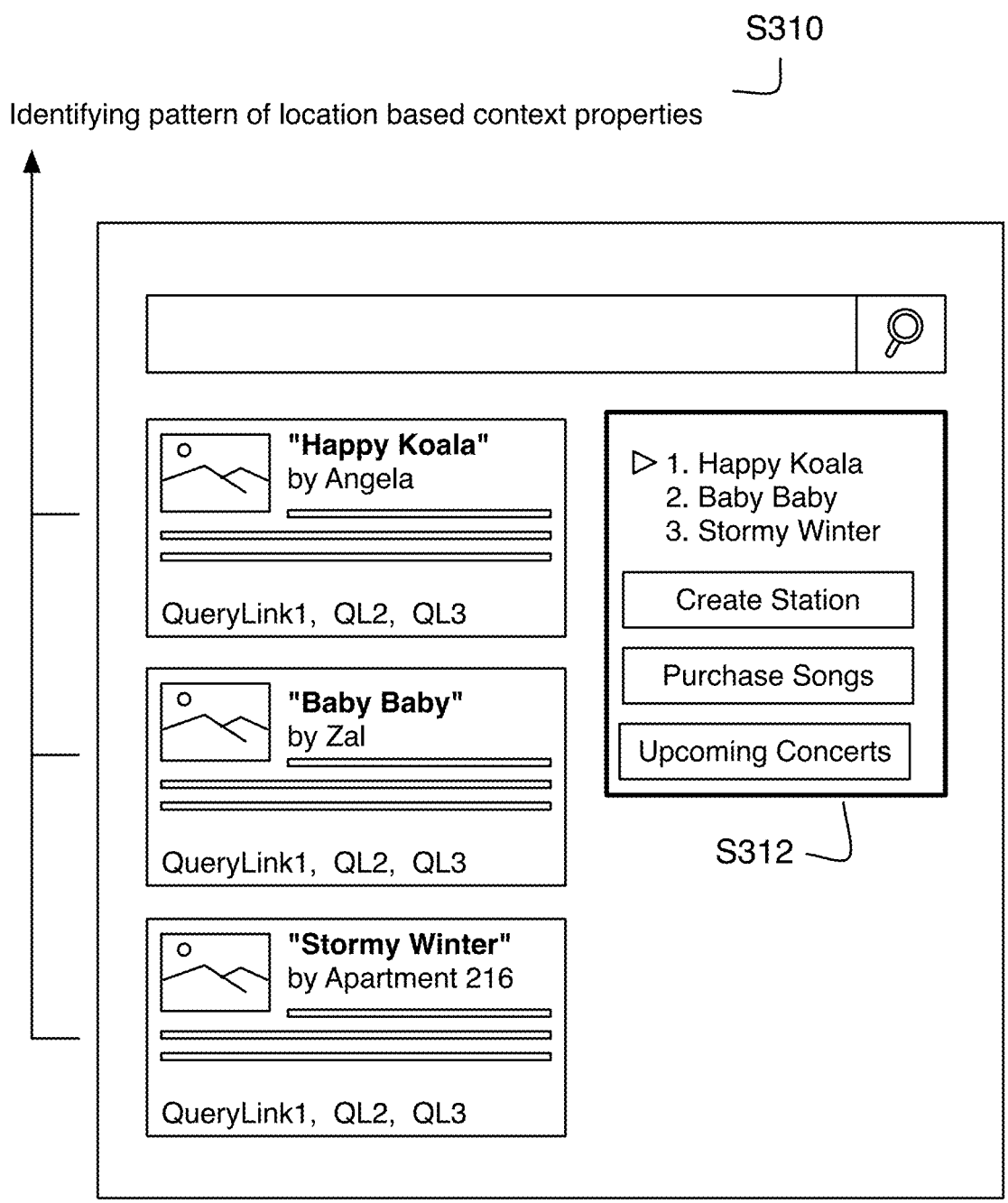
FIG. 14 is a schematic representation of an exemplary implementation inserting a media playlist interface.

In one variation, the extracted patterns may be used to insert contextually appropriate advertisements, sponsored, or suggested result cards into the collection. In another variation, an extracted pattern may conflict with contextual information of a result card. In such a case, the contextual information and optionally queries of related cards may be updated to resolve the conflict, either automatically or after prompting a user for direction. For example, if one result card had set the user contextual location information to San Francisco, but subsequent cards all related to Los Angeles, a prompt may be displayed asking if the user would like to update location information to San Francisco. As an exemplary use case, a collection focused on planning a movie night with friends may include a selected movie time and dinner reservations. The location and timing information for each card may be extracted and formatted into a summarizing itinerary with a timeline specifying the movie time and dinner reservations, and a map with directions between the movie and the restaurant as shown in FIG. 12. As another exemplary use case, a collection may be generated with a plurality of products. The prices of the products may be itemized and tallied in a product summary. A product purchase element can be added to the top (or any location) of the collection interface as shown in FIG. 13. The product purchase element can be automatically invoked when items in the collection satisfy a pattern as a product stream. The elements associated with the product stream may be purchased from the product purchase element, may direct the user to a portal where the items can be purchased. If the collection includes a plurality of links relating to songs, then a playlist may be created in the summary as shown in FIG. 14. If the items relate to travel items, a travel itinerary, a map, a route, travel booking widget, or any suitable interface can be added. The summary generated from extracted patterns may include any suitable number of summary modules. Every card in the collection may not conform to the pattern, but cards that do fit a particular pattern are preferably summarized. The summary modules can be rendered above the collection interface, at the bottom of the collection interface, on either side of the collection interface, within the result stream, or in any suitable locations.

Figure 15:
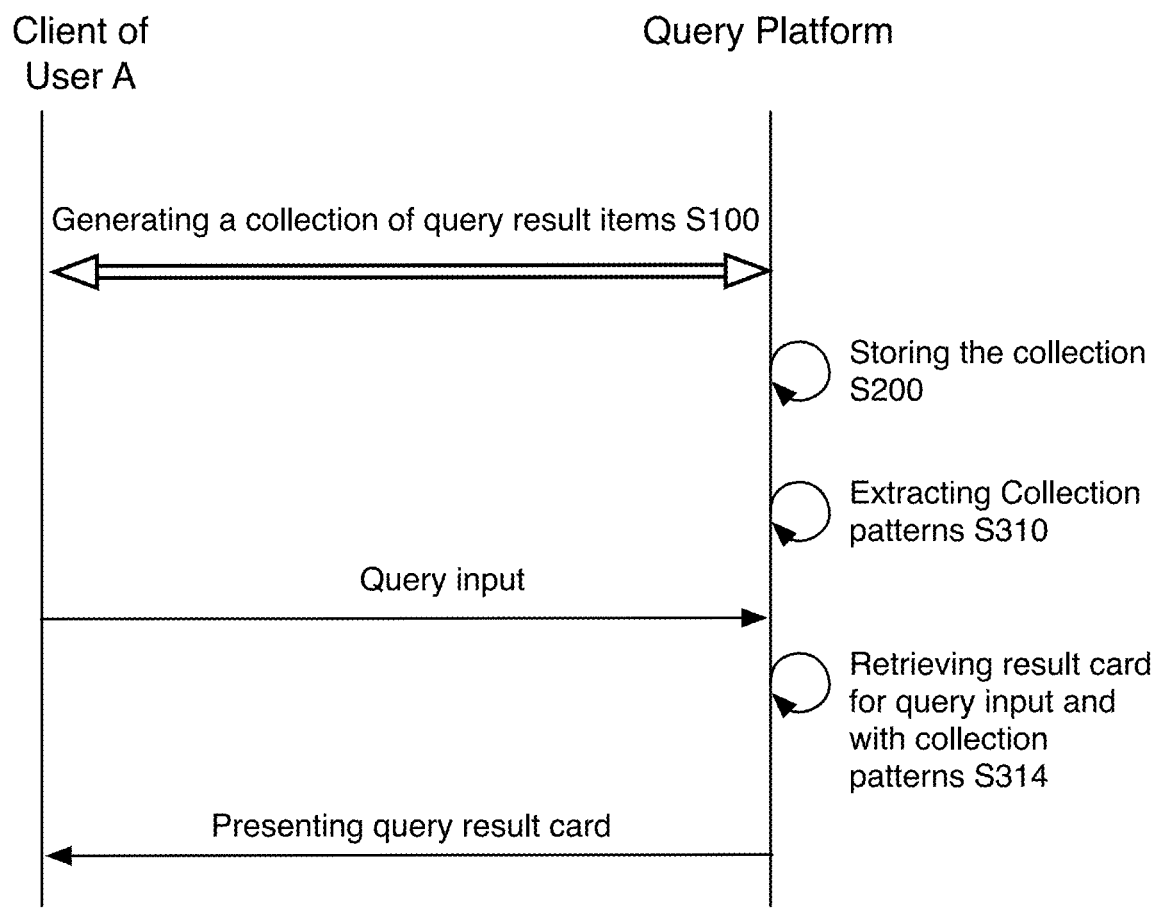
FIG. 15 is a communication flowchart of modifying queries made through the collection.

The extracted patterns can additionally be set as stream-level (i.e., collection-level) context properties and augmenting a collection in a second instance can include modifying queries made through the collection to include extracted pattern information S314 as shown in FIG. 15. As stream-level context properties, subsequent queries made in association with the collection or that branch off of an existing result card, can be submitted using the stream-level context properties to augment, supplement, or alter the new query input. Extraction of patterns can additionally be continually updated so that the context properties of a collection are updated with any new information. For example, a collection may include numerous restaurant information cards within a particular city. A location context property can be set for that city. If, after continued building of the collection, the average location of the collection changes to be more generally described by a multi-state region, the context property can be update to incorporate the new location information.

Figure 16:
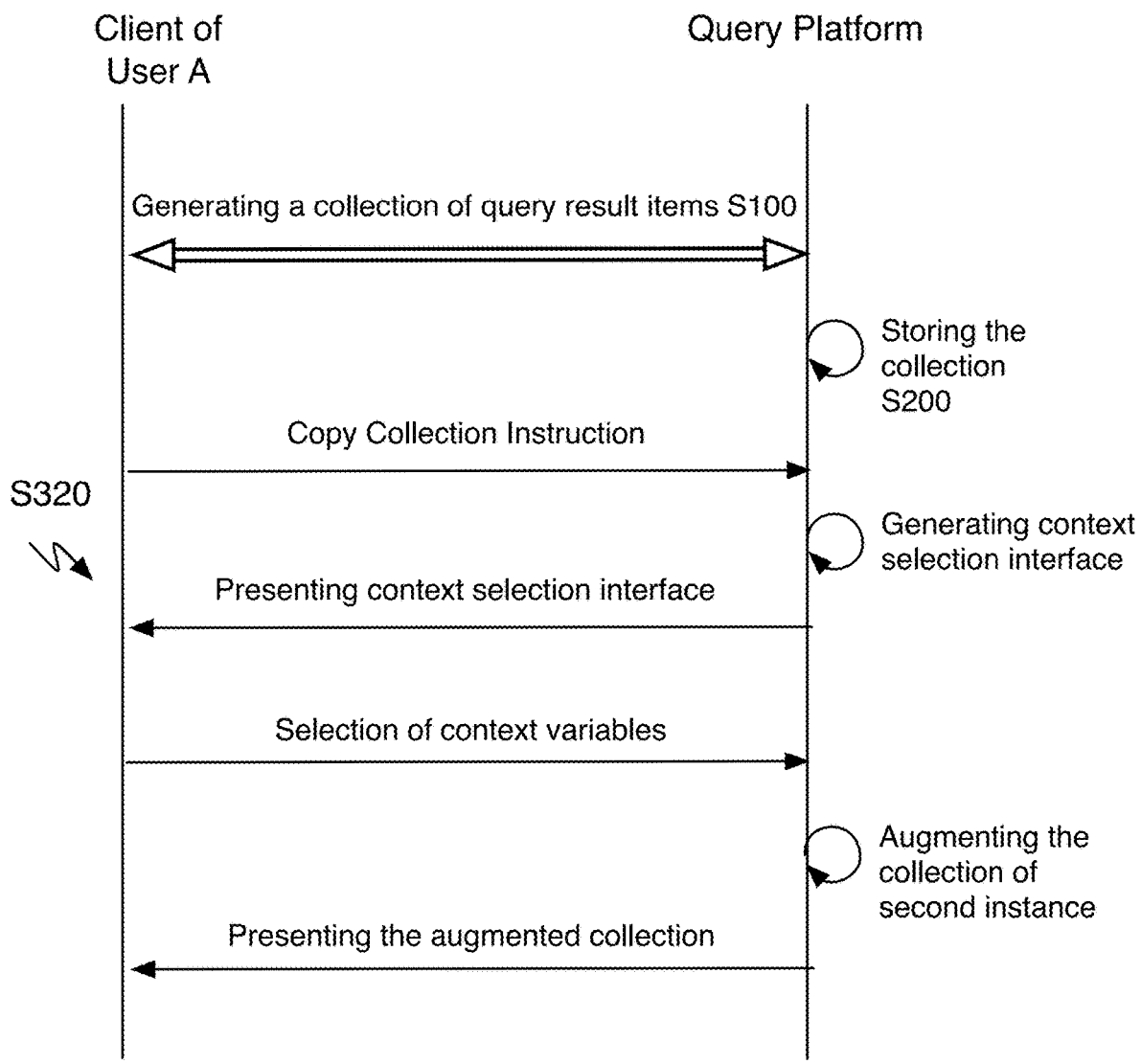
FIG. 16 is a communication flowchart of copying the collection to a second collection of the authoring account and augmenting the second collection according to modified context properties.
Figure 17:
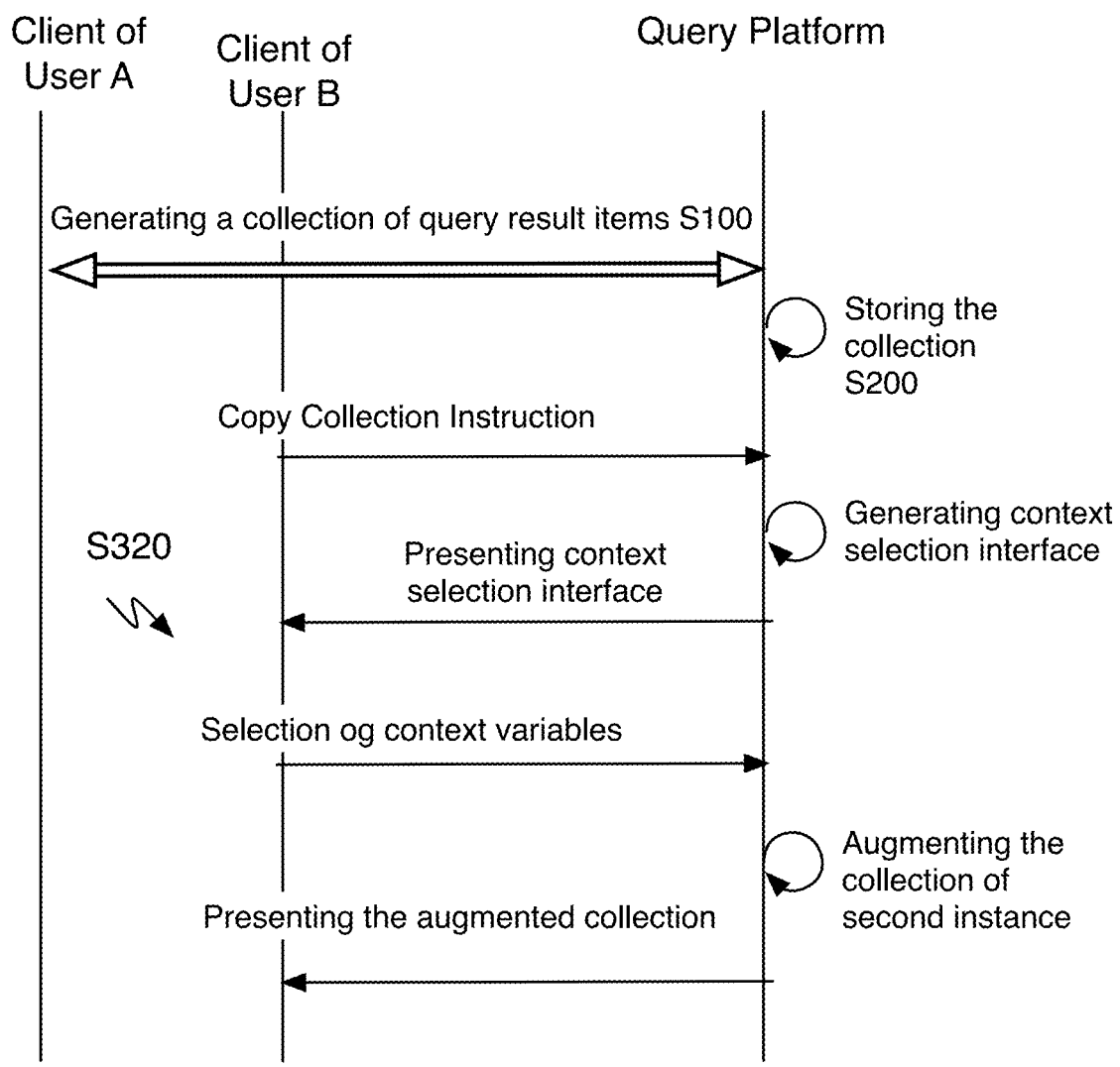
FIG. 17 is a communication flowchart of copying the collection to a second collection of a second account and augmenting the second collection according to modified context properties.

In a third variation of a preferred embodiment, a method may additionally or alternatively include copying the collection to a second collection and augmenting the second collection according to modified context properties S320, which functions to use at least partial content of a first collection to generate, seed, initialize a second collection. The second collection can be generated by applying the modified context properties to the queries of the result cards in the collection. A second collection may be generated from a first search in a variety of ways. In a first approach, an account (the authoring account as shown in FIG. 16 or another account as shown in FIG. 17) can preferably duplicate the collection. Duplicating a collection preferably adds a copy of the collection to a set of collections of the account. The copy of the collection can preferably be edited independently from the first collection. The copy of the collection may additionally be appended, merged, prepended, or otherwise added to an existing collection. In a second approach, a result card of a collection may be copied to a second collection. The result card can preferably be copied in a manner substantially similar to copying a collection. A result card may be copied to create a new collection seeded with that result card or prepended, appended, merged, or otherwise added to an existing collection. Similarly, a result card can be updated with a new query input submission, the query submission can be made to a different service, with modified query input, altered processing of result data, and/or any suitable modification.

In one variation of augmenting the second collection, context properties applied to the queries of the result items can be selected according to the identity of the user copying the collection. Editable context properties and query variables can be pulled from the result cards in the collection and presented within a user interface. For example, if a collection shows result cards of different movies and their respective movie show times for a particular date near a particular location, a user interface could be generated so that the date and location can be edited. Once a date and location are selected the second collection can be generated using the original collection as a base template but refreshing result data dependent on the new date and location context properties. In another variation of augmenting the second collection, the context properties can be automatically applied to queries of the result items according to properties of the user copying the collection. A user account can include various properties that can be used to automatically customize a collection for the user. For example, the user may have a location setting that can refresh result cards that depend on local information. Other suitable properties of the user can include service preferences. In some instances a set of different services may be available to fulfill a particular query input; a user can have a property defining a particular service that should be used. When a preferred service is detected, augmenting the collection can include updating the result data of a result item with an equivalent query input submitted to a service API if the preferred service. The format of the result card may or may not change.

As mentioned above, a template collection may be used to generate a collection according to a set of result cards and variables that impact at least one query for the result cards as shown in FIG. 16. Template collections and result cards are preferably displayed as normal collections, and data object/model characterizing the collection includes defined template variables and the values used in the displayed collection. Alternatively, the template variables may be highlighted, marked, or indicated in the collection. When generating a second collection from a template collection (or template result card), the template variable(s) are preferably collected to complete the retrieval of data for the result cards. The template variables and the corresponding input fields may be displayed within the corresponding cards, or alternatively an account may be guided through completing the template variables prior to generating the second collection. For example, if a user selects to create a new collection based on a template collection. The user may be asked to provide information or input including location information, time information, account information, parameter setting, result card option selection (e.g., selecting a movie option within a result card), and completing template variables in other suitable approaches. Once the template variables are completed, the second collection can be generated. As a collection can have informational dependency and some variables may be dependent on an initial result card. The template variables may be progressively answered as the second collection is progressively generated based on the result card/query order. In one variation, this progressive generation is presented as a series of user interaction steps to build up a collection based on the type of result cards of the copied collection.

Figure 18:
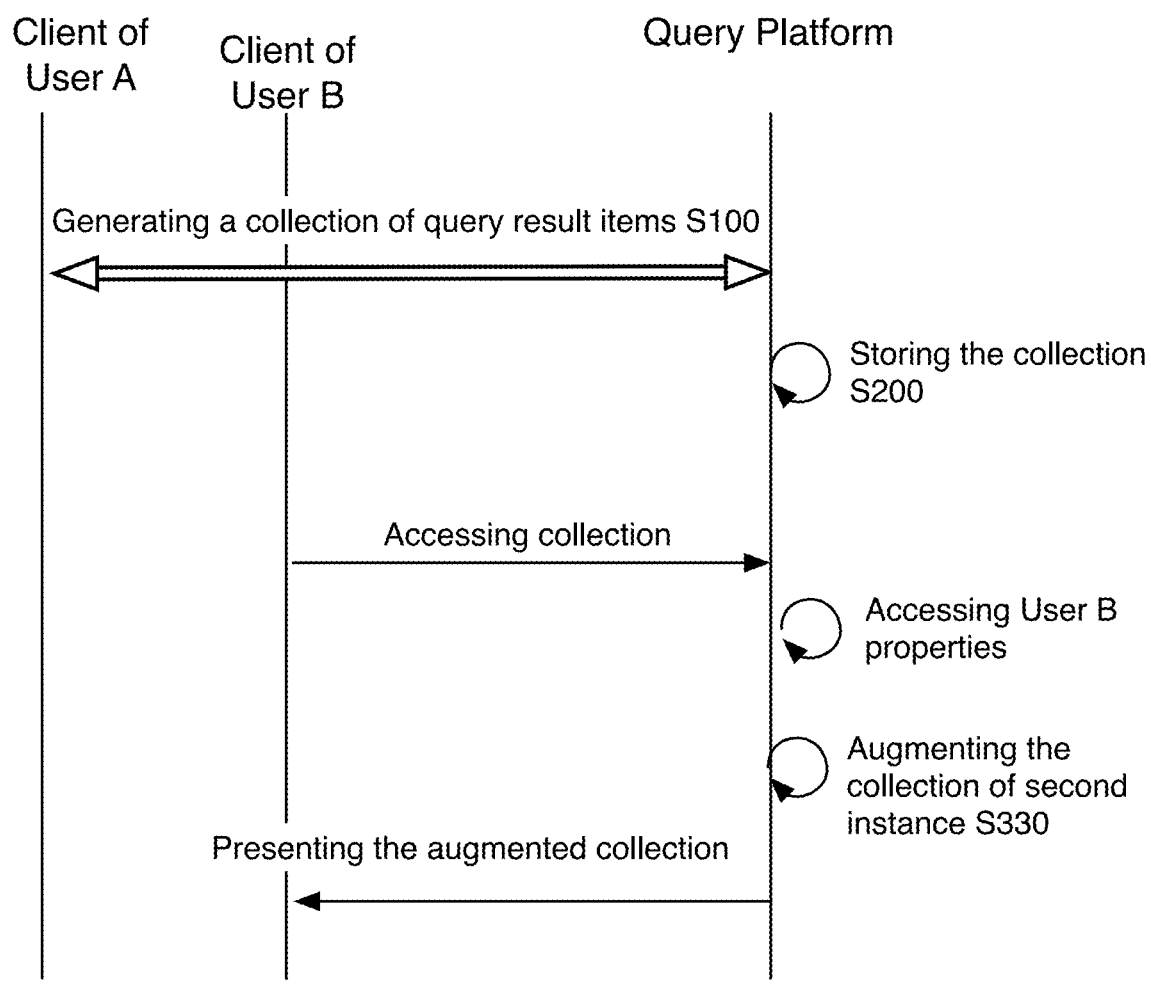
FIG. 18 is a communication flowchart of variation presenting and augmenting the collection according to a second user.
Figure 19:
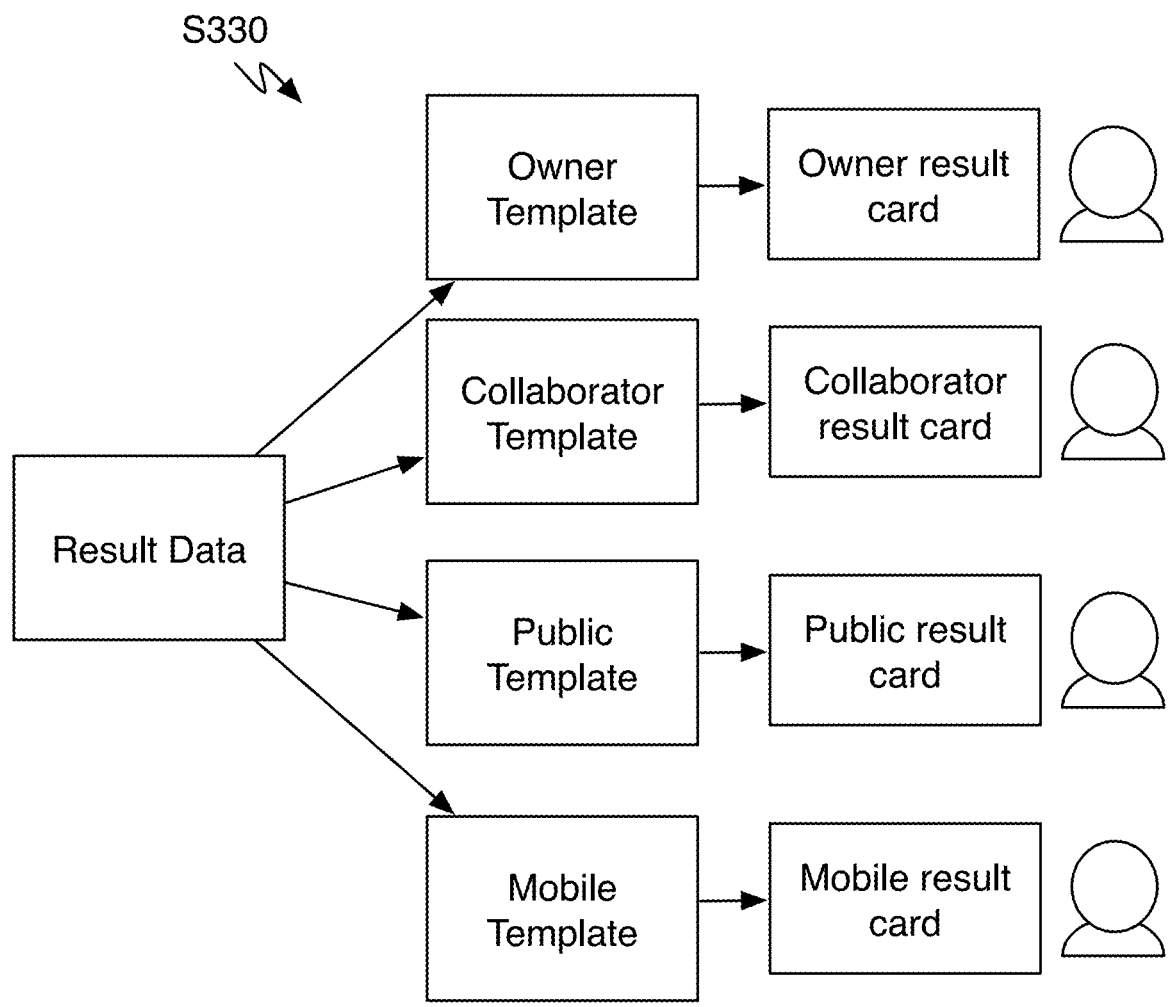
FIG. 19 is a schematic representation of variation presenting and augmenting the collection according to different users.

In a variation of a preferred embodiment, modifying a collection can include presenting and augmenting the collection according to a second user S330, as shown in FIG. 18. As mentioned above, a collection and more specifically at least one result card may be rendered differently depending on who is accessing the collection. The augmentation of the collection is preferably automatic based on settings of the user, usage patterns of the user, or detected properties of the user. Block S330 can be substantially similar to block S320 described above, except is performed live on the collection instead of copying and saving a new collection. The query inputs can be resubmitted (to the same or different services). In one variation, this may be applied for security, enforcing a permissions model of viewing a result card according to the account. Preferably a privacy setting may be set for a collection, and may additionally be set for each result card. Privacy settings may define editors/contributors and viewers of the collection/result card. Preferably, permissions are enforced by a card renderer but may alternatively be integrated into any suitable component of the query platform. When an account is accessing a search steam, the permissions of the accessing account are determined. The permissions are then used in selection of an appropriate card template when rendering result data for a card as shown in FIG. 19. In this way sensitive data may be removed and non-sensitive data of the result card still presented. Enforcing the permissions may be used such that result cards may be used for retrieving personal or sensitive information that would not be appropriate for displaying to other viewers of a collection. In one exemplary application, a result card may be tied to an outside service account of the author of the collection. When a second account accessed the collection, the result card tied to the personal account may be converted into a template card so that the second account can authenticate against the outside service. Once the account has authenticated with the outside service the result data for the second account is displayed.

Figure 20:
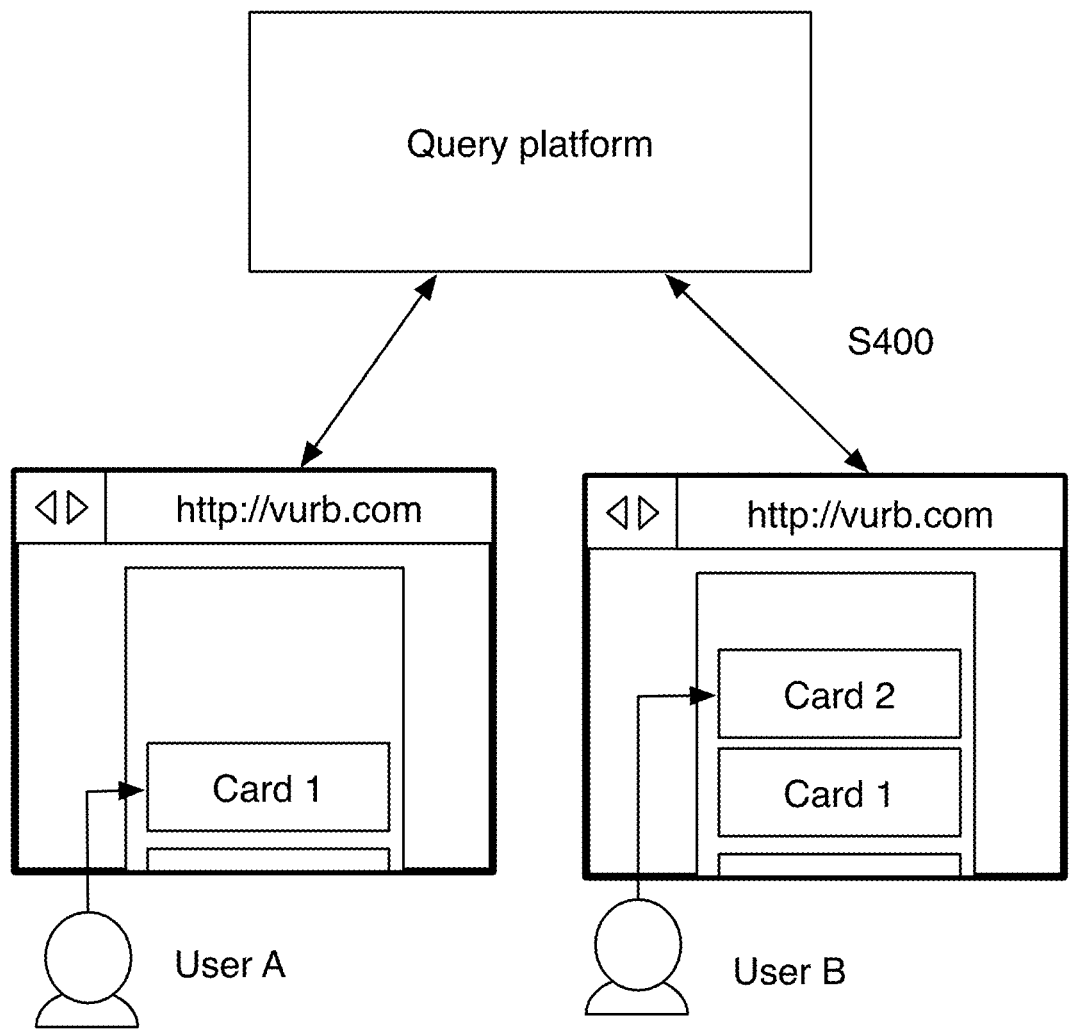
FIG. 20 is a schematic representation of a variation of collaborating on a collection of a preferred embodiment.
Figure 21:
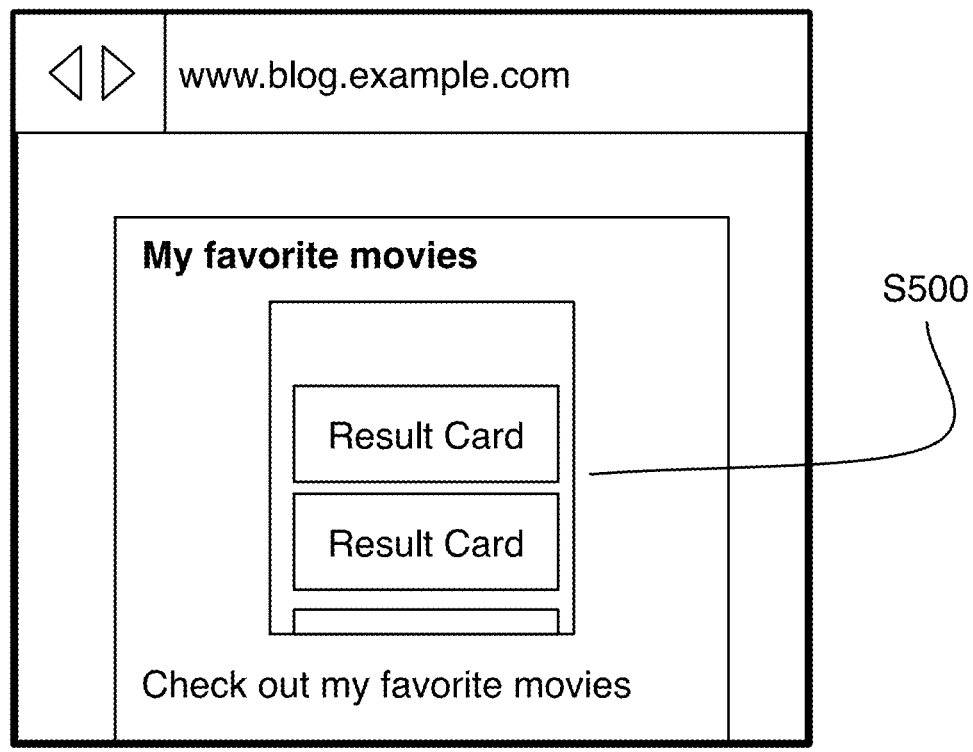
FIG. 21 is a schematic representation of a variation of embedding a search stream of a preferred embodiment.

The method may additionally or alternatively include enabling collaboration S400, which functions to allow multiple accounts to contribute to a collection as shown in FIG. 20. A first account will preferably create or initialize a collection. Collections will preferably default to at least one permission setting, which can determine the allowed collaborators/contributors. The first account or any account with suitable permissions can invite collaborators and/or set the collaboration setting. In one collaboration mode, only invited accounts can collaborate on the collection. In another collaboration mode, accounts with a social connection to the account may collaborate (e.g., a social network friend). In another collaboration mode, any account may contribute to the collection. Collaboration preferably includes modifying and editing the collection in response to directives of at least two accounts. This may include adding queries and result cards, changing existing result cards, removing result cards, rearranging result cards, and/or any suitable action. For example, a generating a collection can include a first user submitting a query and adding at least one result card to the collection and a second user submitting a query and adding at least one result card to the collection.

The method may additionally or alternatively include embedding a collection in an outside portal S500, which functions to provide a way for collections and/or result cards to be shared, viewed, interacted with outside of the query platform. Preferably, the query platform can provide an embeddable code, which can include web markup and scripting instructions. The embeddable collection may alternatively be any suitable form of embeddable data object. The embeddable collection or result card is preferably displayed within an iframe, a flash file, a canvas HTML, object, JAVA applet, or any suitable object to compartmentalize the content. A user can preferably copy and paste or otherwise select the collection for inclusion in an outside website as shown in FIG. 10. The collection may be embedded in any suitable application, document, content, media, or website. An embeddable collection or card may be rendered into a custom embeddable format but may be displayed in any suitable configuration.

In additional variations of a preferred embodiment, a method may additionally or alternatively include sharing of a collection and/or result card, which functions to add a social layer to collections of the query platform. Accounts, collections, and/or specific result cards can preferably be shared by email, shared on social networks, voted on, liked/disliked, favorited, blocked, followed, commented on, or receive any suitable sharing or social action. Notifications may additionally be generated based on activity of accounts and social streams. A user can be notified or view in an activity stream recent actions of accounts. Notifications may alternatively be based on query data of a result card. The query platform may be able to detect when changes occur in the result data of a particular card either during updating a live result card or performing an identical query for another account. The update data or some portion of the data may be conveyed in a notification to an associated account.

Additionally or alternatively, a method of a preferred embodiment may include indexing and searching within a plurality of collections. When searching within a query platform, the search implementation may allow for searching for particular tags, metadata (e.g., location, names, times, etc.), authors, result card content, or any suitable aspect. Search results may additionally be limited to types of collections such as personal collections, collections of friends, collections of followers, collaborative collections, public collections, popular collections, and/or other suitable categorization of collections. In an alternative embodiment, the collections may be indexed for internal use. Indexed collections may be used in combination with machine learning or a recommendation engine to suggest templates and/or similar collections. Similarly, indexing collections may allow for result cards and queries to be recommended. For example, a user may create a collection of movies, and if the list of movies is highly similar to other users' collections of movies, the system could either suggest cards sourced from the similar collections and/or suggest the user view those collections directly.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the query platform system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various operations of the method.

As a person skilled in the art will recognize from the previous detailed description and from the figures and claims, modifications and changes can be made to the preferred embodiments of the invention without departing from the scope of this invention defined in the following claims.

What is claimed is:

1. A computer implemented method comprising:
   generating a shareable search result stream comprising a first result item rendered from a first query result data associated with a first user account;
   adding a second result item rendered from a second query result data associated with a second user account to the shareable search result stream associated with the first user account;
   providing the shareable search result stream comprising the first result item associated with the first user account and the second result item associated with the second user account to a first computing device associated with the first user account and a second computing device associated with the second user account; and updating the shareable search result stream to generate a new result item based on a notification related to one or more user accounts authorized to access the shareable search result stream.

2. The computer implemented method of claim 1, wherein the notification is a location-based notification indicating a current location of a user associated with the one or more user accounts authorized to access the shareable search result stream.

3. The computer implemented method of claim 1, wherein the shareable search result stream is a first shareable result stream, and the method further comprises:
   receiving template variables from the first computing device associated with the first user account;
   creating a template based on the first shareable result stream;
   generating a new shareable search result stream using the template variables and template based on the first shareable result stream; and
   providing the new shareable search result stream to the first computing device.

4. The computer implemented method of claim 1, wherein at least one context property of the first result item is used to augment a second query to generate the second query result data.

5. The computer implemented method of claim 1, wherein providing the shareable search result stream comprising the first result item and the second result item to the second computing device associated with the second user account comprises:
   determining preferences associated with the second user account;
   refreshing at least one result item in the shareable search result stream based on the preferences associated with the second user account, to generate an updated shareable search result stream; and
   providing the updated shareable search result stream to the second computing device.

6. The computer implemented method of claim 5, wherein the preferences comprise a preferred service for the at least one result item that is different from a service used to perform a query to generate query result data used to render the at least one result item, and wherein refreshing at least one result item in the shareable search result stream based on the preferences associated with the second user account, to generate an updated shareable search result stream, comprises refreshing the at least one result item to show content of the preferred service.

7. The computer implemented method of claim 1, wherein the first result item comprises live data and wherein providing the shareable search result stream comprising the first result item and the second result item to a first computing device associated with the first user account and a second computing device associated with the second user account comprises:
   updating the live data of result data of the first result item to generate an updated first result item; and
   providing the shareable search result stream comprising the updated first result item and the second result item to the first computing device associated with the first user account and the second computing device associated with the second user account.

8. The computer implemented method of claim 7, wherein the live data comprises a portion of data of the first result item.

9. A system comprising:
   a memory that stores instructions; and
   one or more processors configured by the instructions to perform operations comprising:
   generating a shareable search result stream comprising a first result item rendered from a first query result data associated with a first user account;
   adding a second result item rendered from a second query result data associated with a second user account to the shareable search result stream associated with the first user account;
   providing the shareable search result stream comprising the first result item associated with the first user account and the second result item associated with the second user account to a first computing device associated with the first user account and a second computing device associated with the second user account; and
   updating the shareable search result stream to generate a new result item based on a notification related to one or more user accounts authorized to access the shareable search result stream.

10. The system of claim 9, wherein the notification is a location-based notification indicating a current location of a user associated with the one or more user accounts authorized to access the shareable search result stream.

11. The system of claim 9, wherein the shareable search result stream is a first shareable result stream, and the operations further comprise:
    receiving template variables from the first computing device associated with the first user account;
    creating a template based on the first shareable result stream;
    generating a new shareable search result stream using the template variables and template based on the first shareable result stream; and
    providing the new shareable search result stream to the first computing device.

12. The system of claim 9, wherein at least one context property of the first result item is used to augment a second query to generate the second query result data.

13. The system of claim 9, wherein providing the shareable search result stream comprising the first result item and the second result item to the second computing device associated with the second user account comprises:
    determining preferences associated with the second user account;
    refreshing at least one result item in the shareable search result stream based on the preferences associated with the second user account, to generate an updated shareable search result stream; and
    providing the updated shareable search result stream to the second computing device.

14. The system of claim 13, wherein the preferences comprise a preferred service for the at least one result item that is different from a service used to perform a query to generate query result data used to render the at least one result item, and wherein refreshing at least one result item in the shareable search result stream based on the preferences associated with the second user account, to generate an updated shareable search result stream, comprises refreshing the at least one result item to show content of the preferred service.

15. The system of claim 9, wherein the first result item comprises live data and wherein providing the shareable search result stream comprising the first result item and the second result item to a first computing device associated with the first user account and a second computing device associated with the second user account comprises:

updating the live data of result data of the first result item to generate an updated first result item; and providing the shareable search result stream comprising the updated first result item and the second result item to the first computing device associated with the first user account and the second computing device associated with the second user account.

16. The system of claim 15, wherein the live data comprises a portion of data of the first result item.

17. A non-transitory computer-readable medium comprising instructions that when executable by a processor cause a computing device to perform operations comprising:

generating a shareable search result stream comprising a first result item rendered from a first query result data associated with a first user account;

adding a second result item rendered from a second query result data associated with a second user account to the shareable search result stream associated with the first user account;

providing the shareable search result stream comprising the first result item associated with the first user account and the second result item associated with the second user account to a first computing device associated with the first user account and a second computing device associated with the second user account; and updating the shareable search result stream to generate a new result item based on a notification related to one or more user accounts authorized to access the shareable search result stream.

18. The non-transitory computer-readable medium of claim 17, wherein the notification is a location-based notification indicating a current location of a user associated with the one or more user accounts authorized to access the shareable search result stream.

19. The non-transitory computer-readable medium of claim 17, wherein the shareable search result stream is a first shareable result stream, and the operations further comprise:

receiving template variables from the first computing device associated with the first user account;

creating a template based on the first shareable result stream;

generating a new shareable search result stream using the template variables and template based on the first shareable result stream; and providing the new shareable search result stream to the first computing device.

20. The non-transitory computer-readable medium of claim 17, wherein at least one context property of the first result item is used to augment a second query to generate the second query result data.

* * * * *